(12) United States Patent
Kuhlemann et al.

(10) Patent No.: US 10,746,580 B2
(45) Date of Patent: *Aug. 18, 2020

(54) FLOW METER WITH MEASURING CHANNEL

(71) Applicant: GWF MessSysteme AG, Lucerne (CH)

(72) Inventors: Holger Kuhlemann, Sarstedt (DE); Mark Frister, Hannover (DE); Jürgen Skripalle, Irsee (DE); Markus Helfenstein, Lucerne (CH)

(73) Assignee: GWF MessSysteme AG, Lucerne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/317,122

(22) PCT Filed: Jul. 13, 2017

(86) PCT No.: PCT/EP2017/067765
§ 371 (c)(1),
(2) Date: Jan. 11, 2019

(87) PCT Pub. No.: WO2018/011372
PCT Pub. Date: Jan. 18, 2018

(65) Prior Publication Data
US 2019/0226893 A1 Jul. 25, 2019

(30) Foreign Application Priority Data
Jul. 13, 2016 (DE) .................. 10 2016 112 882

(51) Int. Cl.
*G01F 1/66* (2006.01)
*G01F 15/18* (2006.01)

(52) U.S. Cl.
CPC .............. *G01F 1/662* (2013.01); *G01F 15/18* (2013.01); *G01F 15/185* (2013.01)

(58) Field of Classification Search
CPC ........................................................ G01F 1/66
See application file for complete search history.

(56) References Cited

U.S. PATENT DOCUMENTS 6,931,944 B2    8/2005  Wiest et al.
7,000,485 B2 *  2/2006  Ao .......................... G01F 1/662
                                                    73/861.29

(Continued)

FOREIGN PATENT DOCUMENTS

CN          101084415 B        5/2010
CN          105209864 A       12/2015

(Continued)

OTHER PUBLICATIONS

EP Office Action for Application No. EP17745141.6 dated Nov. 13, 2019 (4 pages; English translation only).

(Continued)

*Primary Examiner* — Jewel V Dowtin
(74) *Attorney, Agent, or Firm* — Bejin Bieneman PLC

(57) ABSTRACT

Disclosed is a flow meter with at least two measuring sensors, preferably ultrasonic sensors, spaced apart from each other, wherein the coupling of the measuring signals into and out of a fluid is performed via a coupling element According to the disclosure, the measuring channel is formed with an approximately oval or trapezoid cross-section.

16 Claims, 28 Drawing Sheets

(56) References Cited

U.S. PATENT DOCUMENTS

| | | | | |
|---|---|---|---|---|
| 7,412,902 | B2* | 8/2008 | Wiest | G01F 1/662 |
| | | | | 73/861.25 |
| 8,955,392 | B2* | 2/2015 | Liu | G01F 1/66 |
| | | | | 73/861.28 |
| 9,291,488 | B2* | 3/2016 | Bober | G01F 1/66 |
| 2011/0079090 | A1 | 4/2011 | Kroemer et al. | |
| 2012/0191382 | A1 | 7/2012 | Fuji et al. | |
| 2013/0167655 | A1 | 7/2013 | Fujii et al. | |
| 2014/0020478 | A1* | 1/2014 | Ao | B06B 3/00 |
| | | | | 73/861.27 |

FOREIGN PATENT DOCUMENTS

| | | | |
|---|---|---|---|
| DE | 4416826 A1 | 11/1995 | |
| DE | 199 44 411 A1 | 4/2001 | |
| DE | 10120355 A1 | 10/2002 | |
| DE | 10 2004 061404 A1 | 7/2006 | |
| DE | 102005057888 A1 | 6/2007 | |
| DE | 10 2010 020338 A1 | 11/2011 | |
| EP | 0650034 A1 | 4/1995 | |
| EP | 0890826 A1 | 1/1999 | |
| EP | 0890826 B1 | 11/2009 | |
| EP | 2306160 A1 | 4/2011 | |
| EP | 2696174 A | 2/2014 | |
| EP | 2386836 B1 | 1/2016 | |
| JP | S43-6589 Y1 | 3/1968 | |
| JP | H07-139982 A | 6/1995 | |
| JP | 2004521367 A | 7/2004 | |
| JP | 2014077643 A | 5/2014 | |
| WO | 2003006932 A1 | 1/2003 | |
| WO | 2004036151 A1 | 4/2004 | |
| WO | 2005031368 A2 | 4/2005 | |
| WO | 2011040038 A1 | 4/2011 | |

OTHER PUBLICATIONS

English translation of Written Opinion of the International Searching Authority for PCT/EP2017/067763 dated Nov. 7, 2017 (6 pages).

International Search Report and Written Opinion for PCT/EP2017/067763 dated Nov. 7, 2017 (13 pages, with English translation of ISR).

Russian Federation Office Action for Application No. 2019103855/28(007254) dated Aug. 29, 2019 (4 pages; translation only).

International Search Report and Written Opinion for PCT/EP2017/067765 dated Oct. 13, 2017 (11 pages; with English translation).

JPO Notification of Reasons for Rejection for JP2019501656 dated Feb. 25, 2020 (with English translation; 8 pages).

Russian Office Action dated Jan. 17, 2020 regarding Russian Patent Application No. 2019103855 with English translation (11 pages).

English translation of Written Opinion of the International Searching Authority for PCT/EP2017/067765 dated Oct. 13, 2017 (6 pages).

Office Action from Chinese Patent Office for Application No. CN2017800432810 dated Mar. 17, 2020 (19 pages; with English translation).

Office Action from Chinese Patent Office for Application No. CN201780043385.1 dated Mar. 24, 2020 (18 pages; with English translation).

* cited by examiner

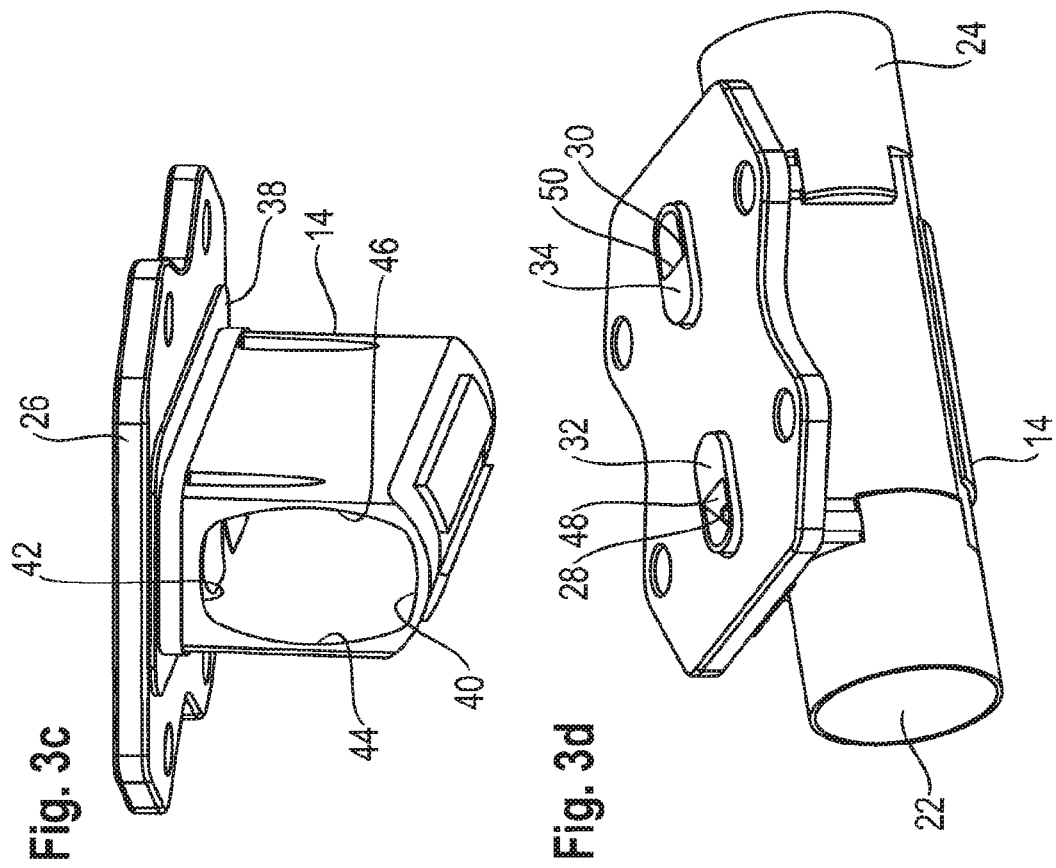
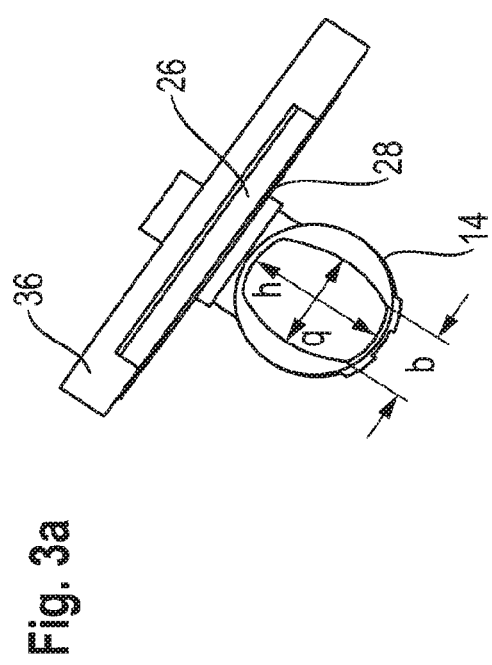
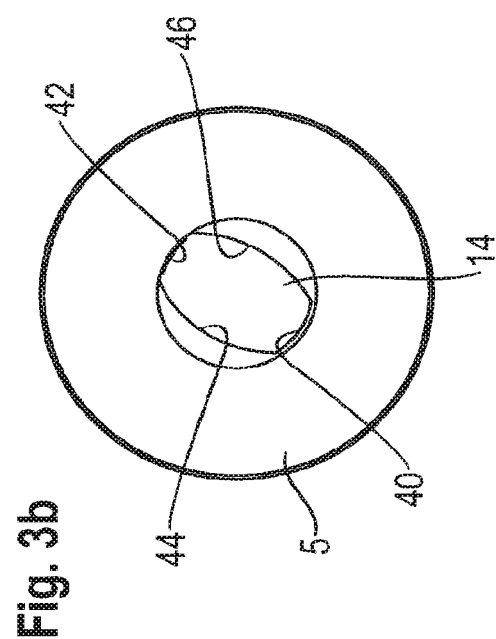

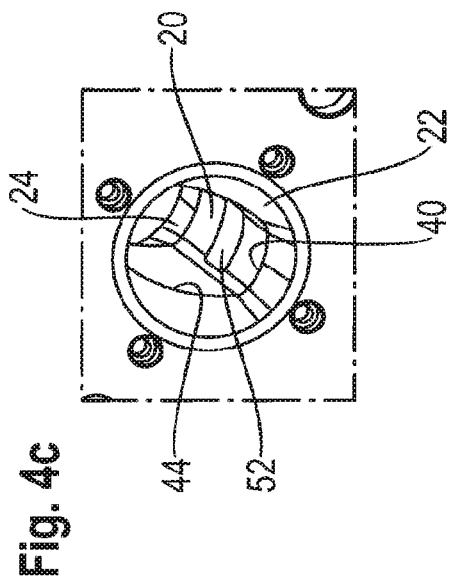
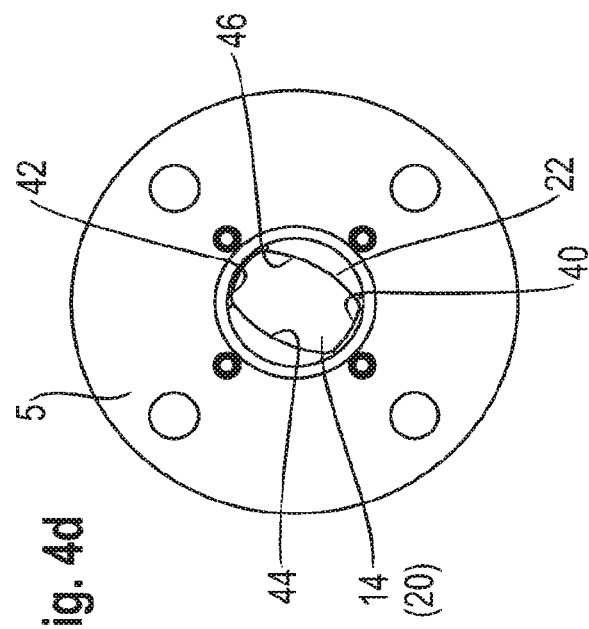
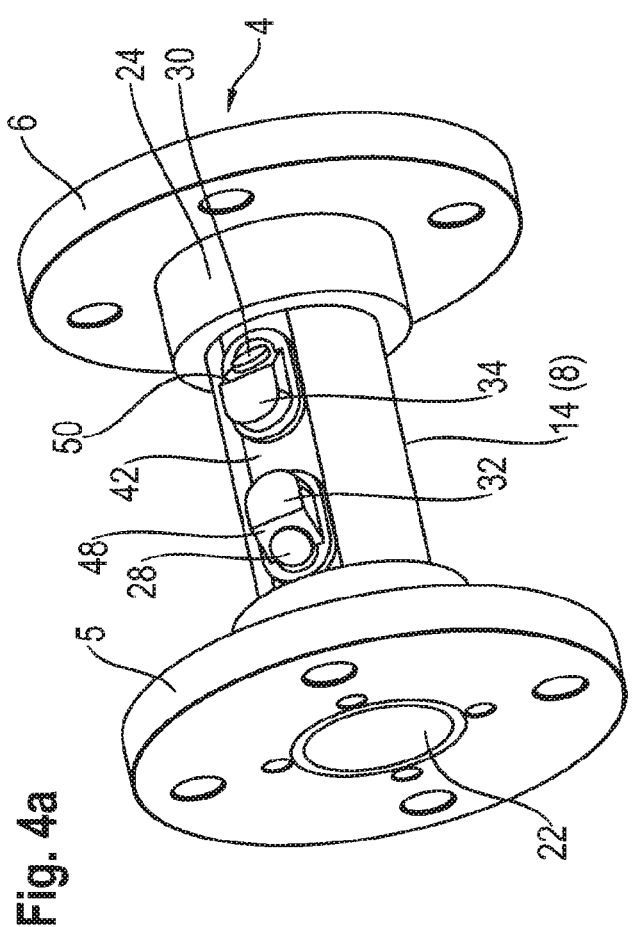
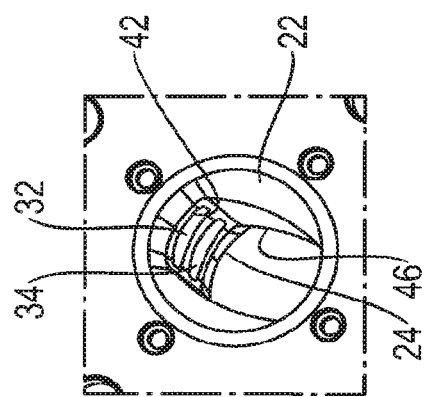

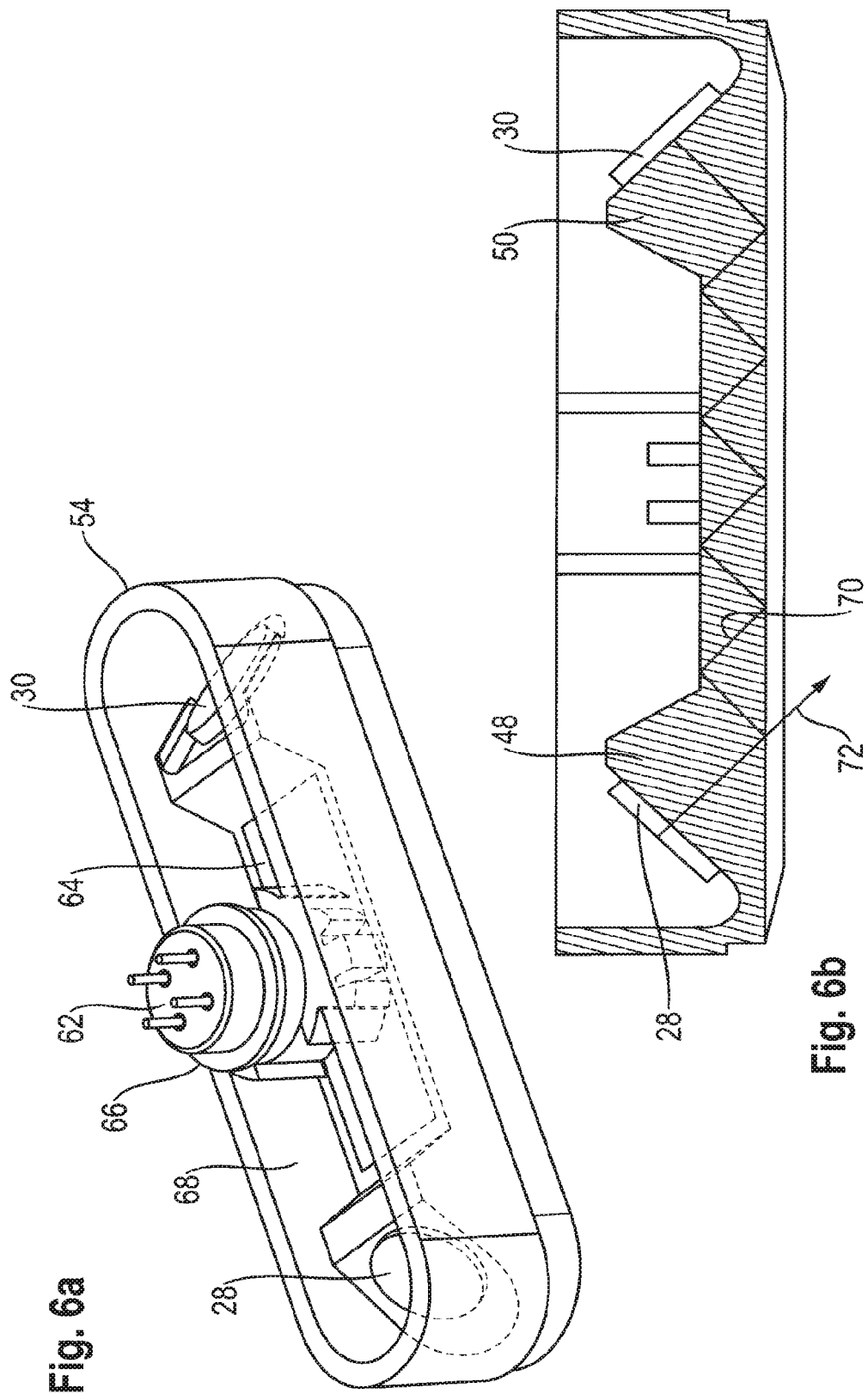

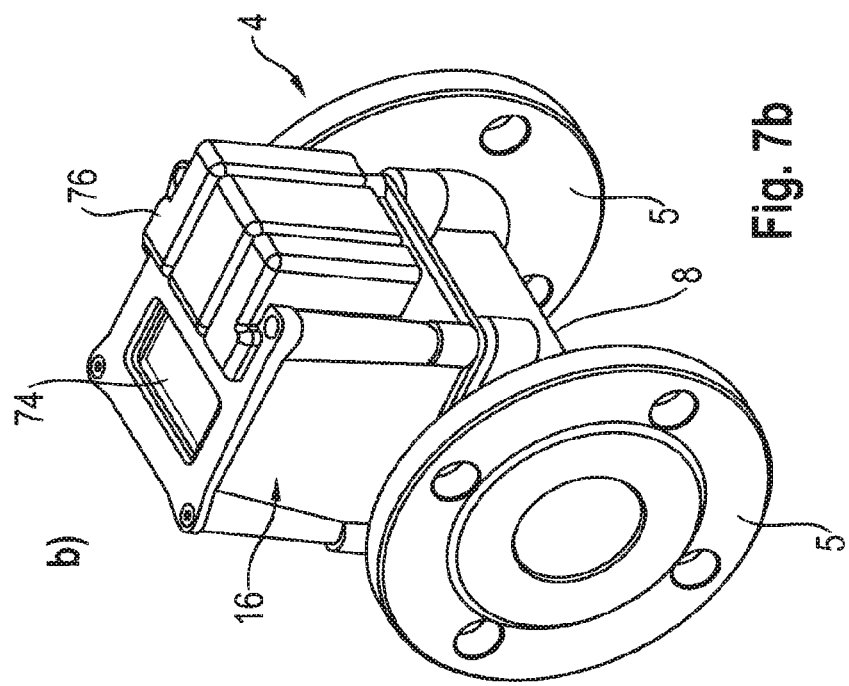
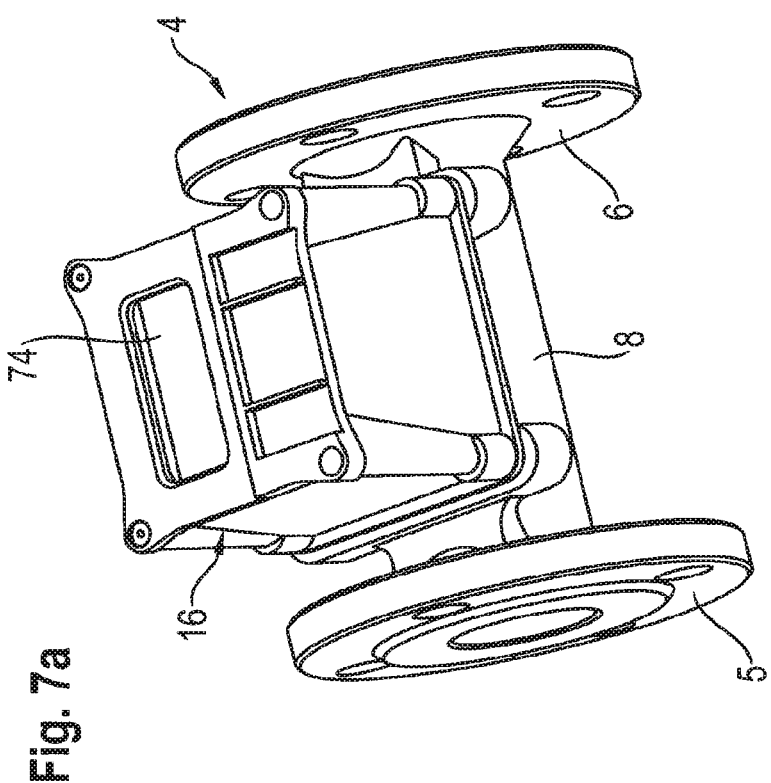

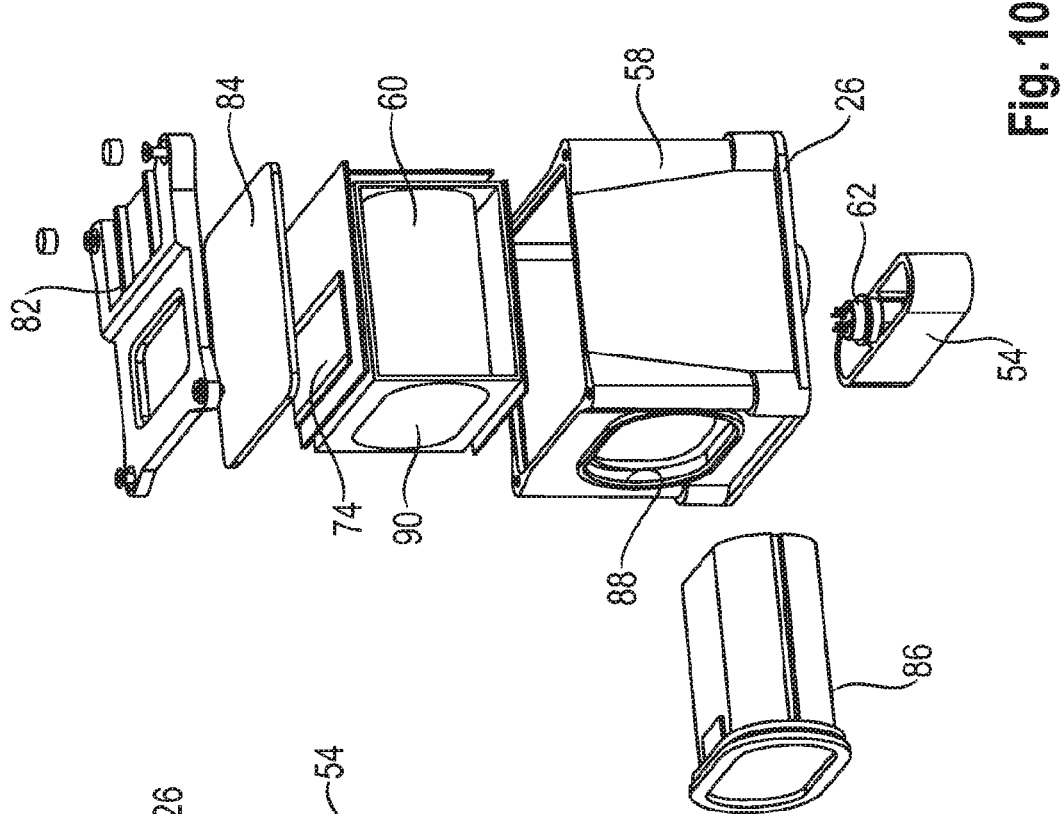
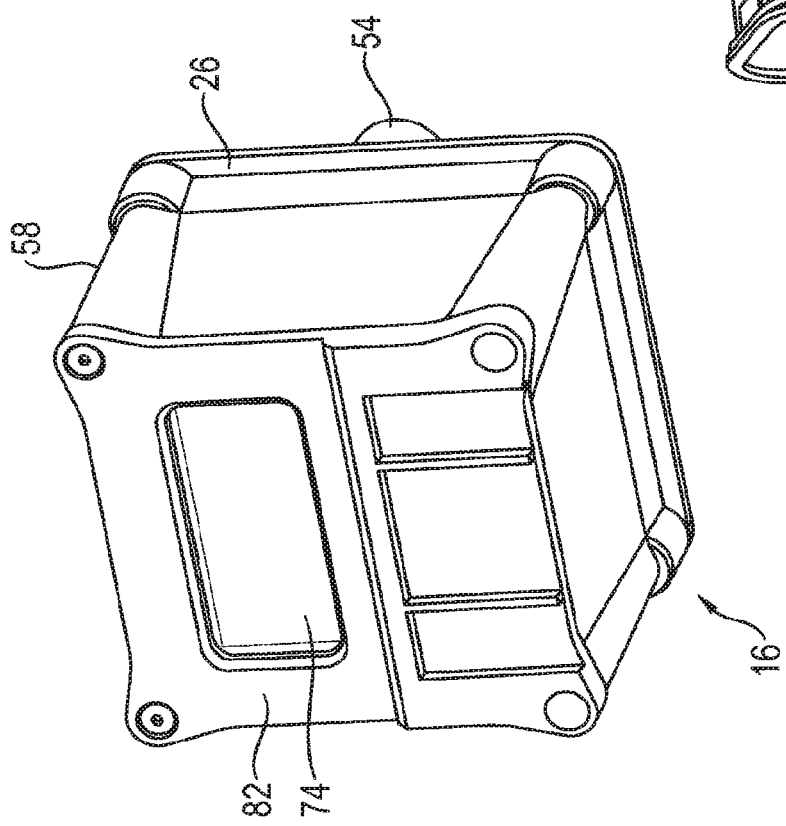

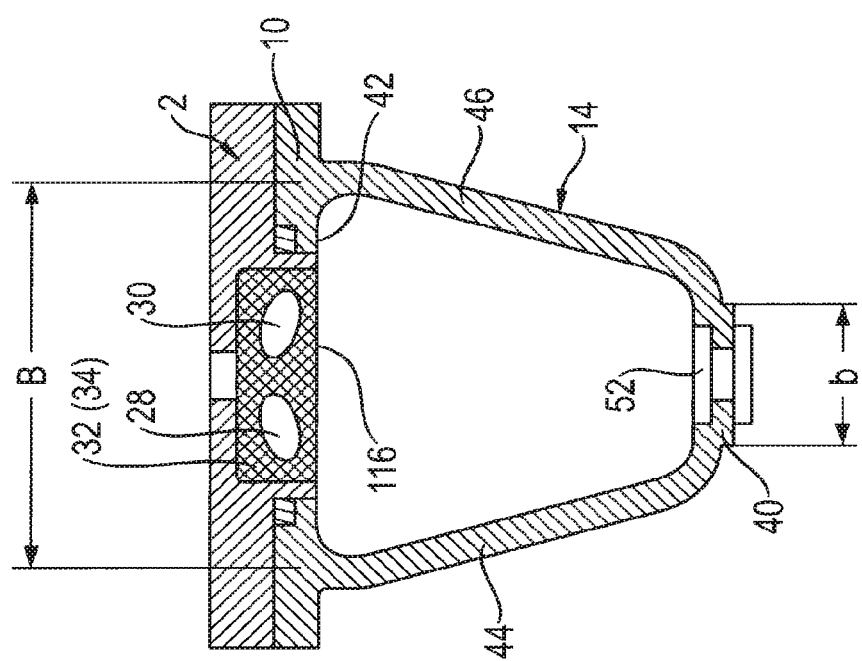

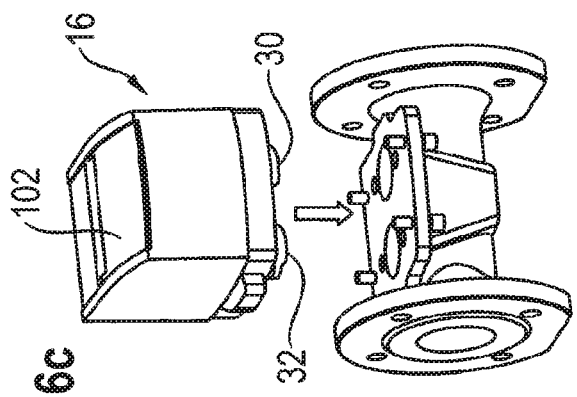
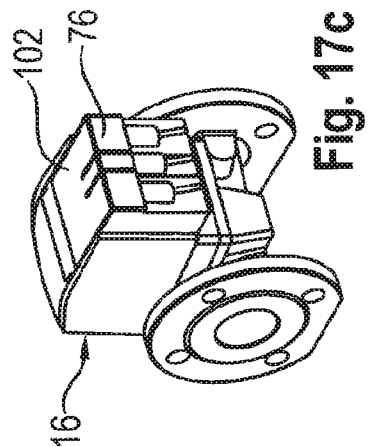
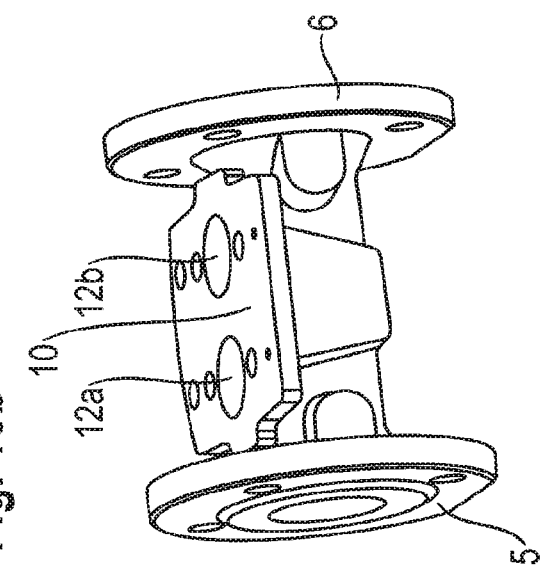
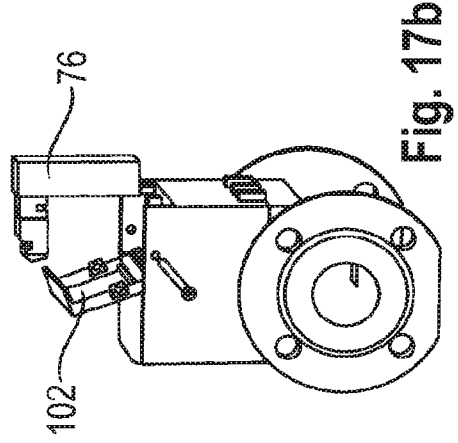
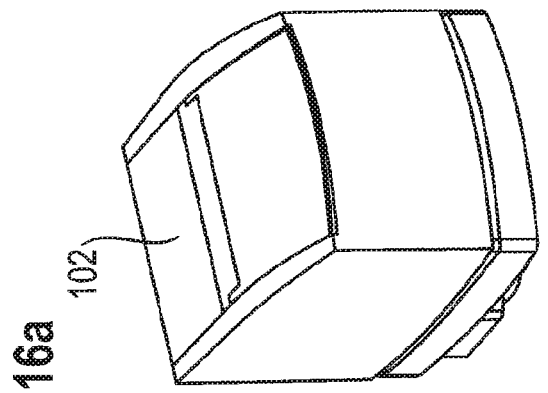
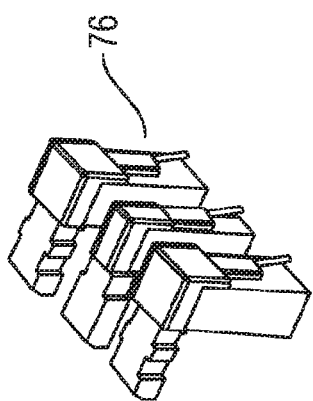

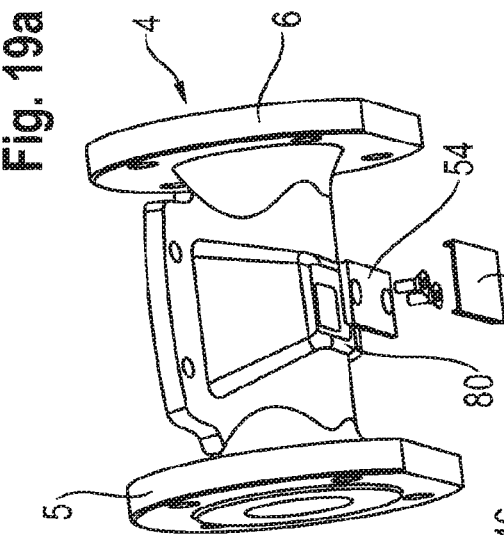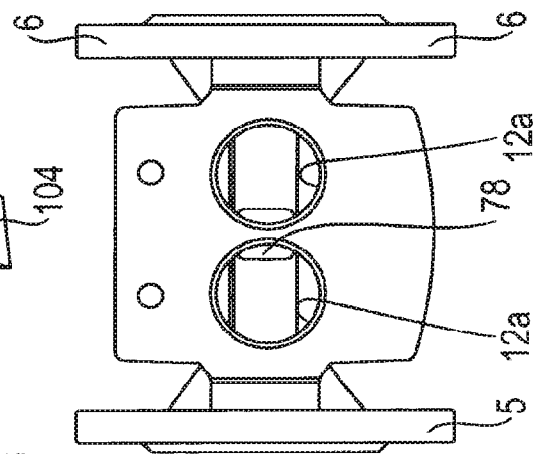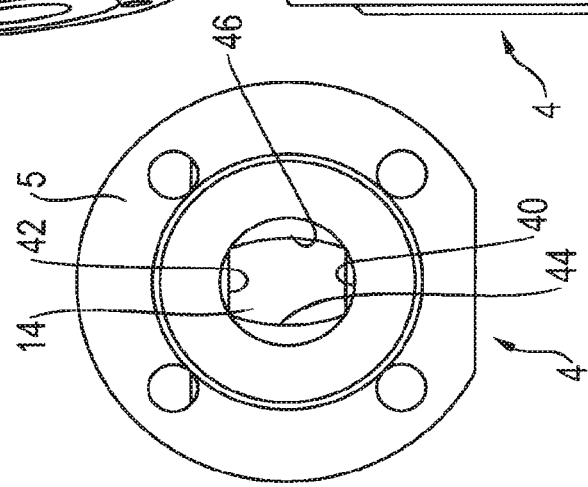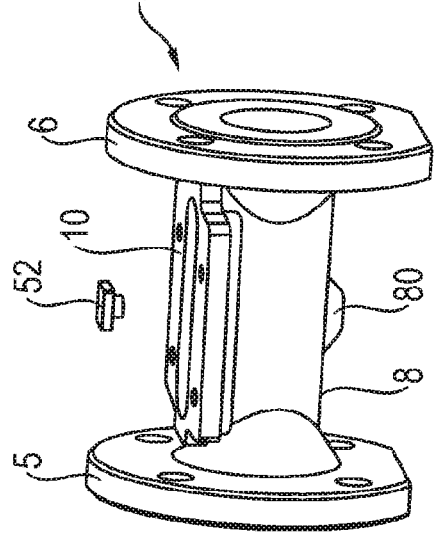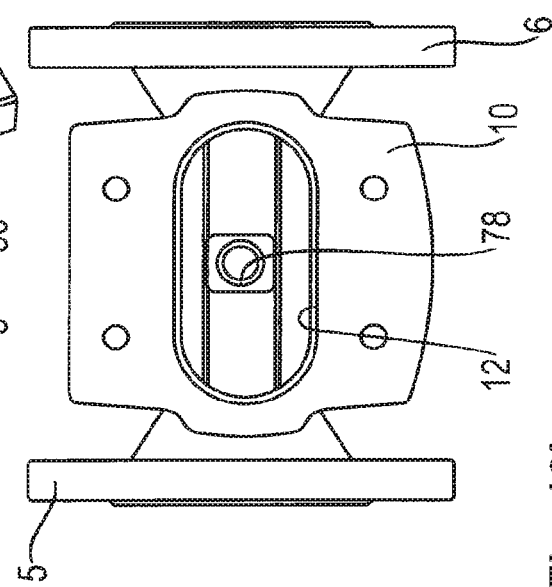

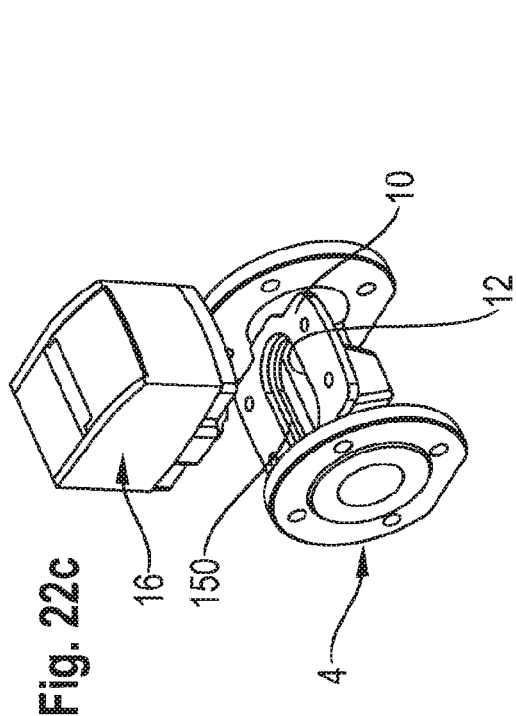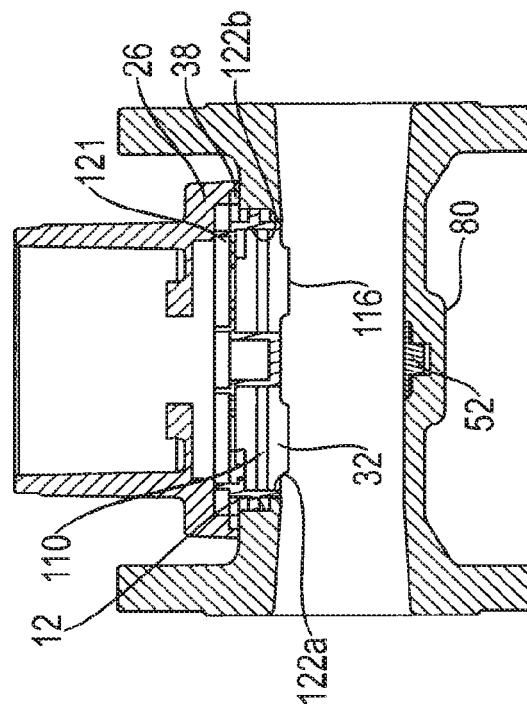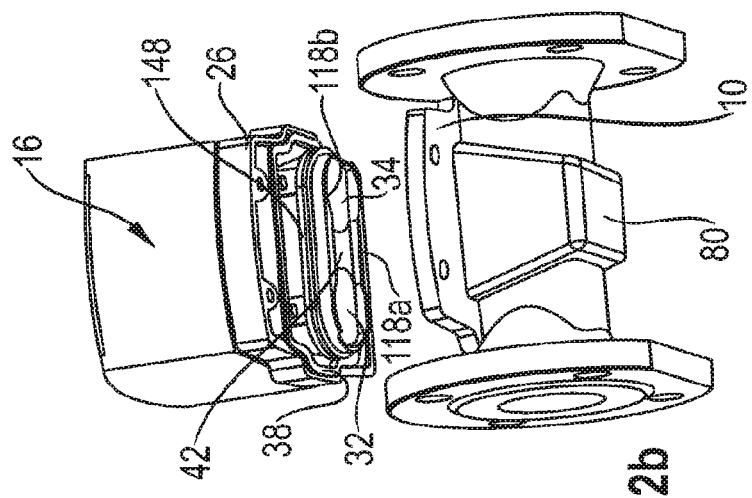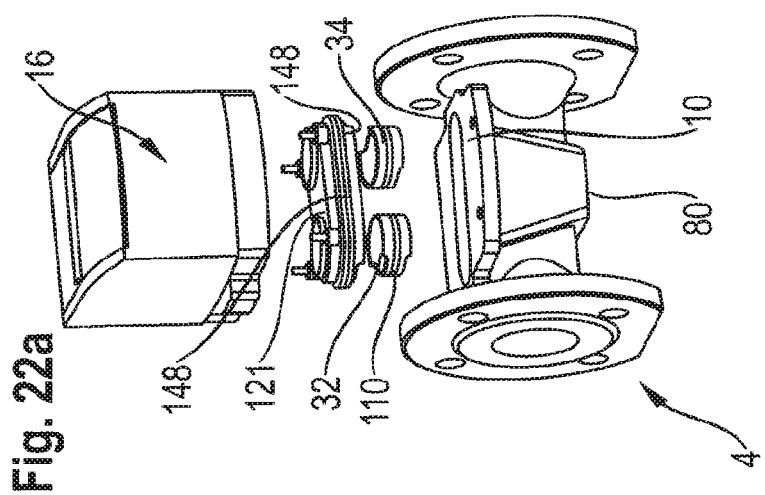

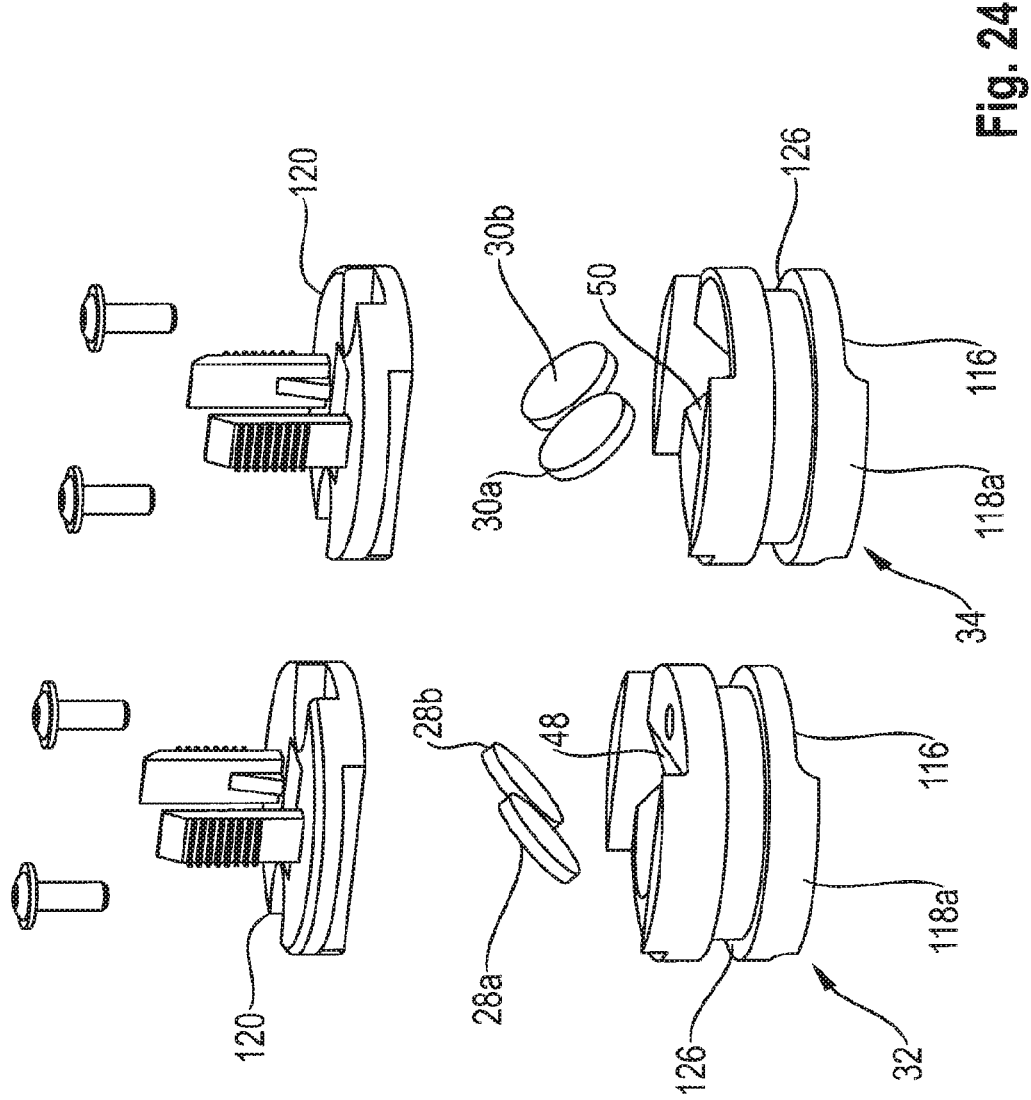

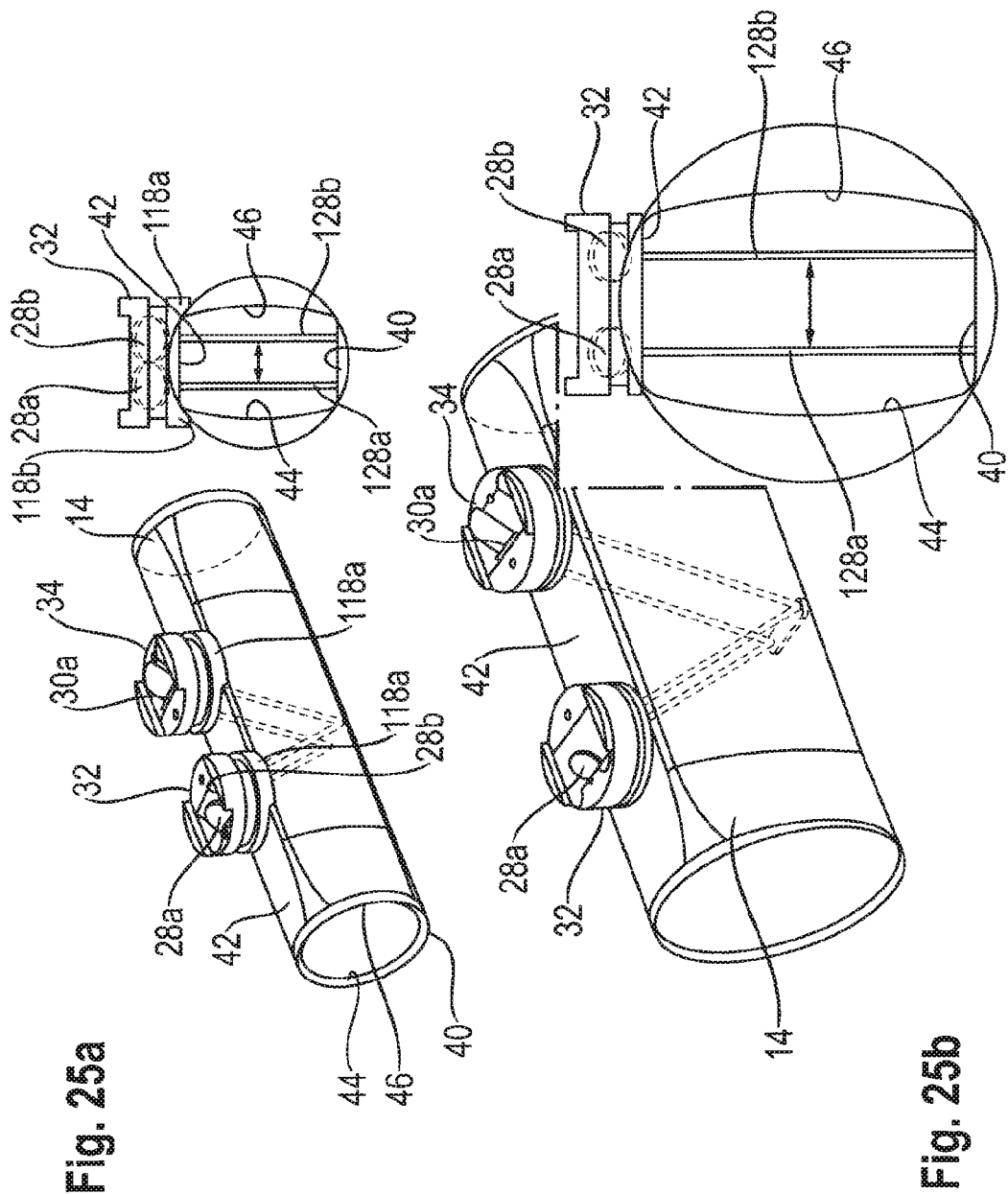

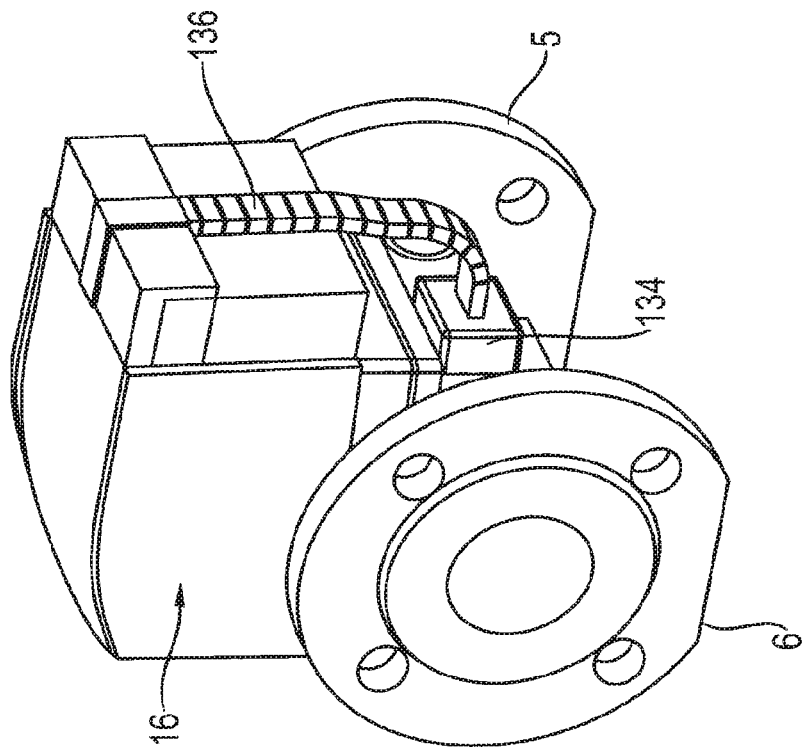
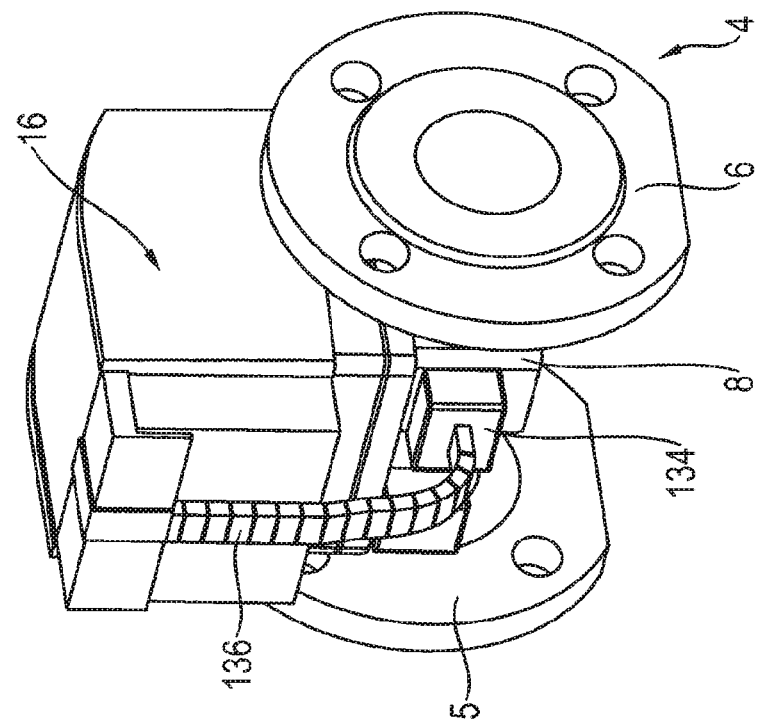

FLOW METER WITH MEASURING CHANNEL

CROSS-REFERENCE TO RELATED APPLICATIONS

This application is a national stage of, and claims priority to, Patent Cooperation Treaty Application No. PCT/EP2017/067765, filed on Jul. 13, 2017, which application claims priority to German Application No. DE 10 2016 112 882.1, filed on Jul. 13, 2016, which applications are hereby incorporated herein by reference in their entireties.

DESCRIPTION

The disclosure relates to a flow meter described below.

Such flow meters can, for example, have two ultrasonic transducers, which are inserted as so-called "clip-on-solutions" at a distance from each other in a pipe section of the pipe, wherein both transducers act as emitter and receiver. The measuring signals are coupled obliquely through the pipe-section wall into the fluid.

The flow speed can then be determined from the runtime of the measuring signals from the emitter to the receiver in a manner known per se. Such flow meters are described, for example, in the printed publications WO 2004/036151 A1 and DE 10 2005 057 888.

The disadvantage of clip-on-flow meters is that the measuring signals penetrate the wall of the measuring channel, so that different measuring signals are obtained for different materials of which the measuring channel can be made, so that the influence of the material must be taken into account in the measuring signal evaluation.

Furthermore, solutions are known having a measuring insert in which the ultrasonic transducers are accommodated. This measuring insert is inserted into a recess of a pipe section/measuring channel, wherein the actual measuring channel can also be a part of this measuring insert.

Such a solution is disclosed, for example, in DE 101 20 355 A1, wherein the two ultrasonic transducers are arranged in the flow direction at a distance from each other and on opposite sides of the measuring channel.

In EP 2 306 160 A1, a flow meter/flow counter is disclosed, in which the measuring insert accommodates the ultrasonic transducer and also forms the actual measuring channel. This measuring insert is attached to a tangential flange of a pipe section of a housing of the flow meter. A profile body forming the measuring channel immerses into a recess of the pipe section surrounded by the flange, which influences the streaming within the measurement area, and on which reflectors for the measuring signals are additionally provided. In this solution, the two ultrasonic transducers are arranged in a pot-shaped housing part of the measuring insert, which is closed towards the streaming and is immersed in it.

A similar solution is shown in EP 2 386 836 B1. In this example, the measuring insert carries two ultrasonic transducers arranged in the streaming direction offset to each other, which are also accommodated in a pot-shaped housing part and which project into the measuring channel through an opening, which is surrounded by a flange, of a pipe section of a housing. The stream guidance within the measuring channel is determined by a housing insert which can be inserted from the front side of the housing and which also carries reflectors for the ultrasonic signals, so that the ultrasound is emitted by one of the ultrasonic transducers and reflected via the reflectors to the other ultrasonic transducer, which is located downstream, for example. Of course, the signal can also be guided in the reverse direction.

In the published publication EP 0 890 826 B1, a flow meter is described, in which a measuring insert is also attached to a tangential flange in the area of a pipe section of a housing. The measuring insert carries two ultrasonic transducers which are inserted into the recesses of a bottom of a housing part and are sealed there by means of a respective seal. The whole measuring insert is then sealed against the flange with another circumferential seal, which encompasses both ultrasonic transducers. In this example, the measuring channel is also formed by the measuring insert, which is inserted into the pipe section of the housing through the recess encompassed by the flange. This measuring channel is rectangular.

In all solutions described above, the reflectors are formed diametrically with respect to the ultrasonic transducers, so that at least two reflectors must be provided in order to guide the ultrasonic signals.

In the latter flow meter, the two ultrasonic transducers are each arranged in a sensor housing, hereafter called coupling element, and project radially into the measuring channel so that the fluid flows around them.

A disadvantage of such solutions is that the streaming in the area of the measuring channel, in particular in the area of sensors, breaks off or becomes swirled so that measurement errors occur, in particular for small nominal widths.

In view of this, the disclosure is based on the object of creating a flow meter/flow counter with improved measuring accuracy.

This object is solved by a flow meter as described below.

According to the disclosure, the flow meter has a measuring channel which can be attached to a pipe through which a fluid flows and on which a measuring unit is held which has at least two measuring sensors, preferably ultrasonic transducers, which are spaced apart from each other and which are immersed in at least one recess of the measuring channel. The coupling and decoupling of the measuring signals into and out of the fluid takes place via a common or a respective coupling element, which accommodates the measuring sensor(s).

According to the disclosure, the measuring channel is designed with a cross-section profile that has a larger nominal width in the emitter/receiver direction of the sensors than transverse to it. According to the disclosure, this is formed in that the measuring channel has an oval shape. Alternatively, the measuring channel may also have a trapezoid shape.

Due to this even, rounded cross-section profile, the streaming can be made more even for an optimal, enlarged signal path as compared to known solutions with a rectangular profile or a round profile, so that the measuring accuracy is improved as compared to conventional solutions.

The entire cross-section is preferably designed to be slightly smaller than the inlet and outlet cross-section of the flow meter, so that the fluid stream is accelerated in the area of the measuring channel. By increasing the dimensions in the emitter and receiver direction, the signal path and thus the runtime of the signal are also increased compared to a round cross-section.

In a particularly preferred example, the measuring channel is approximately oval in shape, i.e. the measuring channel is not limited by straight walls in the direction of its high axis, but by slightly concavely curved side walls—this contributes to further even out the fluid stream.

In a particularly preferred example, the side walls running in the direction of the high axis (approximately in emitter and receiver direction of the ultrasonic signals) are curved and form the aforementioned oval shape with approximately flat or slightly curved transverse walls running approximately in the direction of the transverse axis. Surprisingly, it turned out that such an oval geometry guarantees optimal streaming and an accompanying maximum signal quality.

In an alternative solution, instead of the oval shape, a roughly trapezoidal cross-section can be formed, wherein a transverse wall comparatively wide in the transverse direction is formed on the sensor side and a transverse wall with a significantly smaller width or a rounding is formed on the reflector side.

Advantageously, the coupling element is inserted flush into a circumferential wall of the measuring channel. This means that neither the coupling element nor the actual measuring sensor or another housing part project into the measuring channel, so that the measuring accuracy is significantly increased as compared to conventional solutions due to the more even streaming.

According to an example, the coupling elements are inserted flush into one of the transverse walls of the measuring channel.

The coupling of the signals is optimal if the coupling element has a coupling wedge that is inclined obliquely to the measuring channel axis and on which the ultrasonic transducer rests.

Sealing is particularly simple if this coupling element is sealed by means of a seal in the measuring channel.

Advantageously, the ratio of the width of the measuring channel in the vertex of the curvature of the side wall to the width of the transverse walls in the transverse direction can be >1.2, preferably approx. 1.3 to 1.6. Alternatively or additionally, the ratio of the height extension of the side wall to the width of the transverse wall can be >1.5, preferably approx. 1.5 to 2.

The fluid stream can be further evened out if, for example for small nominal widths, the coupling element extends as far as into the side wall. Also in this area, the coupling element is flush with the side wall, so that there are no projecting components that interfere with streaming.

In an example, the coupling element or several coupling elements are attached to a measuring housing which accommodates the control electronics, further sensors, a battery pack, communication modules and/or a power supply. The battery pack can preferably be designed to be replaceable.

In one example, the measuring housing is designed with a bottom in which the coupling element(s) with the ultrasonic transducers are inserted directly or by means of a sensor accommodation.

The construction of the housing of the flow meter is further simplified if the measuring channel has a flange that encompasses at least one recess into which at least one coupling element is immersed and to which a system adapter of the measuring housing is attached.

According to a further development, a reflector device is arranged on the transverse wall remote from the ultrasonic transducers, which is preferably inserted flush into a pocket of the transverse wall.

By the flush insertion of the reflector/mirror and/or of the sensors/coupling element into the measuring channel, turbulences and streaming stalls are prevented in the area of these components as well as an associated dirt deposition and the resulting signal falsification.

The construction can be further simplified if the pipe section forms the measuring channel. This requires that the pipe section is constructed according to the above-defined specifications (oval shape). Alternatively, the measuring channel can also be inserted into the pipe section.

In another example, the flow meter has a housing that has two inlet and outlet mounting flanges between which the pipe section and/or the measuring channel extends, the flow cross-section in the lead-in area or respectively the lead-out area of the mounting flanges being smaller than in the measuring channel.

The signal quality can be further improved if the coupling element is made of PEEK, PSU or PEI.

In a further preferred solution, a double sensor is accommodated in a coupling element so that two approximately parallel signal paths are formed.

In order to further improve the measuring accuracy, a reference path can be formed in each coupling element, which is determined by the geometry of the coupling element and its material.

In such a coupling element, a temperature sensor or another sensor can be accommodated which, for example, detects heating of the fluid or the coupling element during the measurement and can make a corresponding signal correction.

The Applicant reserves the right to base independent patent claims on the double sensor or the geometry of the coupling element with a reference path and/or with an additional sensor or the type of sealing of the measuring insert, which can be made the subject matter of divisional applications or the like.

According to an example, the coupling elements are combined to form a measuring bar.

This measuring bar can also be formed with a reference path, which for example enables a zero drift correction.

The influence of air bubbles and sedimentations can be reduced by tilting or horizontal positioning of the profile cross-section—this solution can also be used as subject matter of an independent patent request.

Examples of the disclosure are explained in more detail below using schematic drawings. These show:

FIGS. 3a, 3b, 3c, 3d show views of a further example of a flow meter according to the disclosure;

FIGS. 4a, 4b, 4c, 4d show views of a third example of a flow meter according to the disclosure;

FIGS. 6a, 6b show a partial drawing of a measuring bar/coupling element of the example according to FIGS. 5a, 5b, 5c, 5d;

FIGS. 7a, 7b show two further examples of a flow meter according to the disclosure;

FIG. 9 shows a further drawing of the example according to FIG. 7a;

FIG. 10 shows an exploded view of a measuring insert of the example according to FIG. 9, 7a;

FIG. 14 shows a schematic diagram of a further example of a flow meter according to the disclosure with measurement attachment;

FIGS. 16a, 16b, 16c show main component groups of a further example of a flow meter according to the disclosure with a measurement attachment;

FIGS. 17a, 17b, 17c show variations of the example according to FIGS. 16a, 16b, 16c with external modules;

Figure 20:
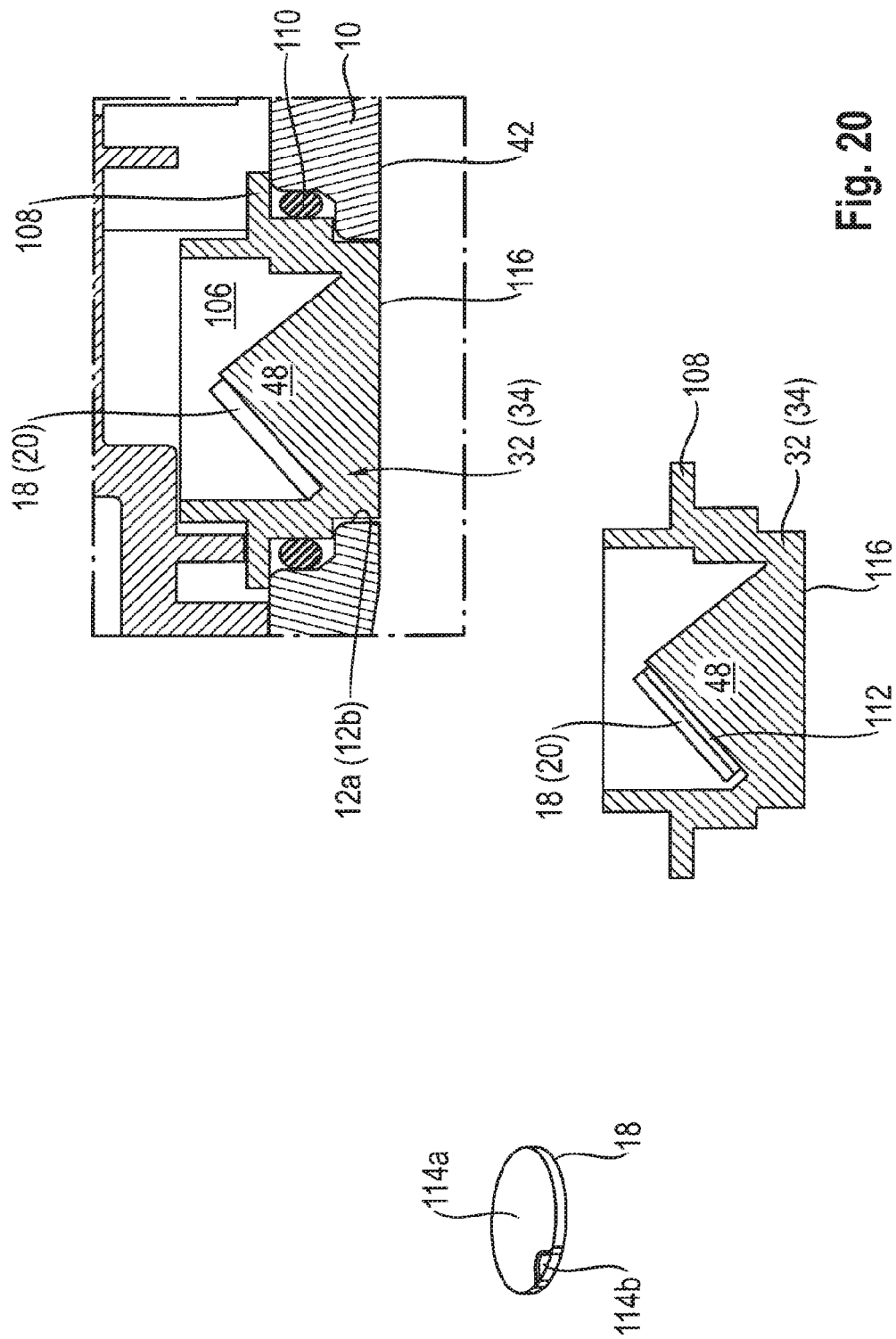
Figure 21C:
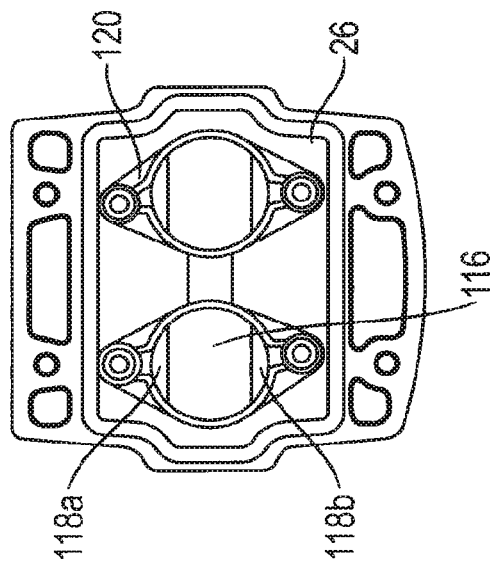
Figure 21D:
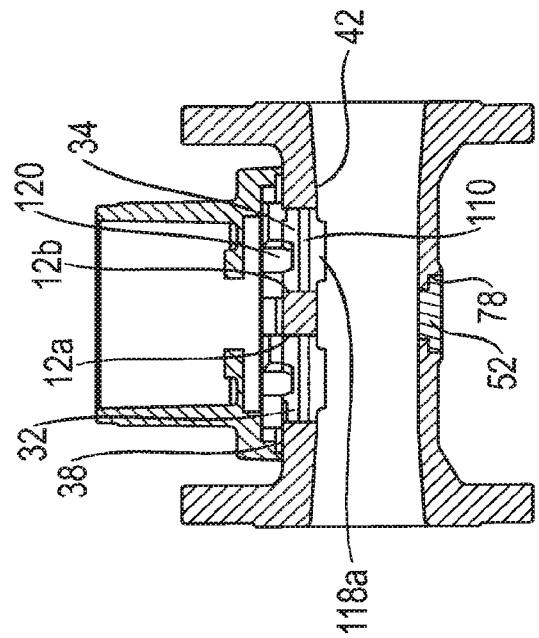
Figure 21B:
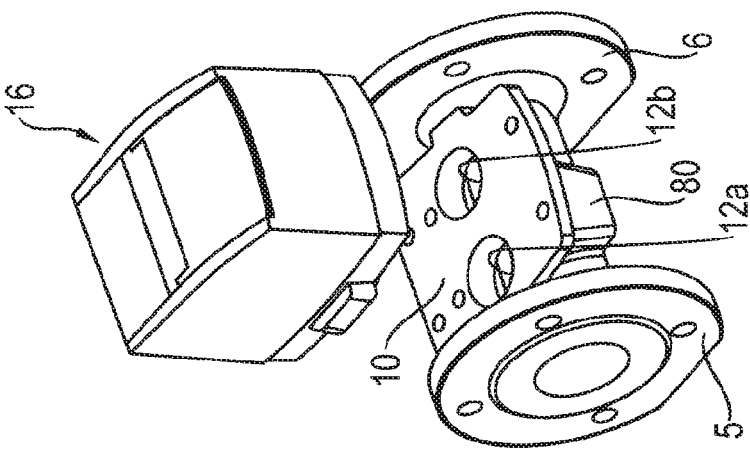
Figure 21A:
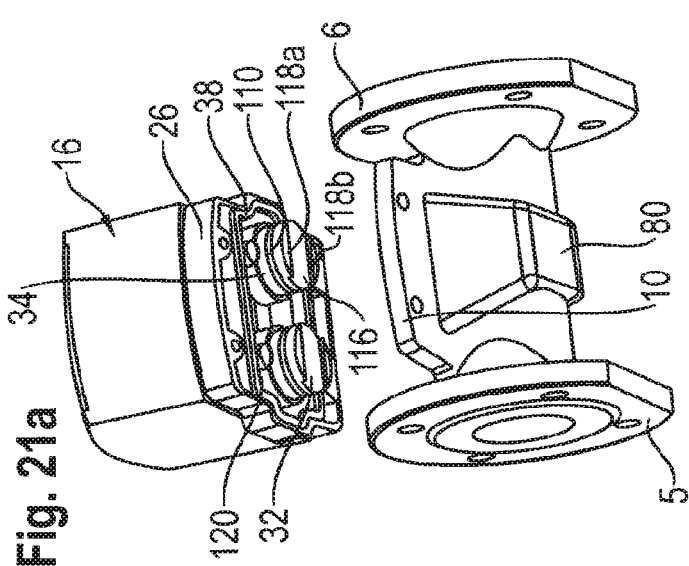
Figure 23:
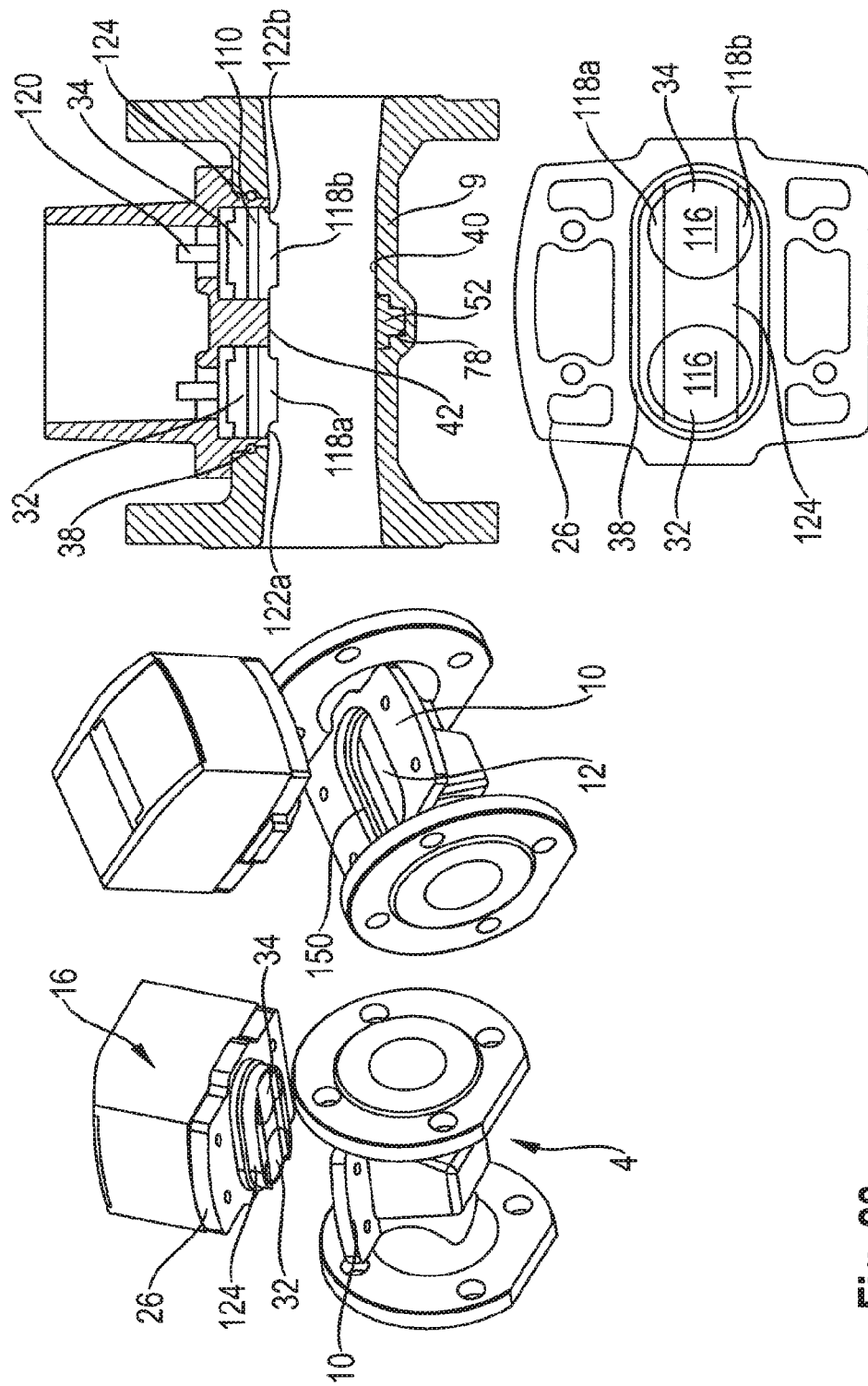
Figure 26C:
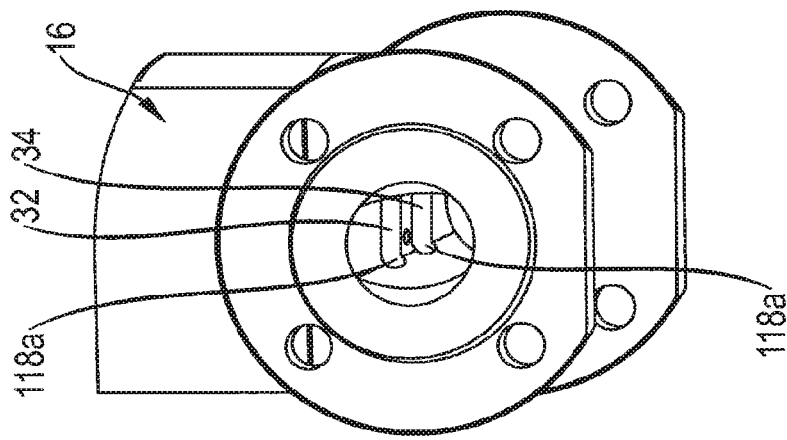
Figure 26B:
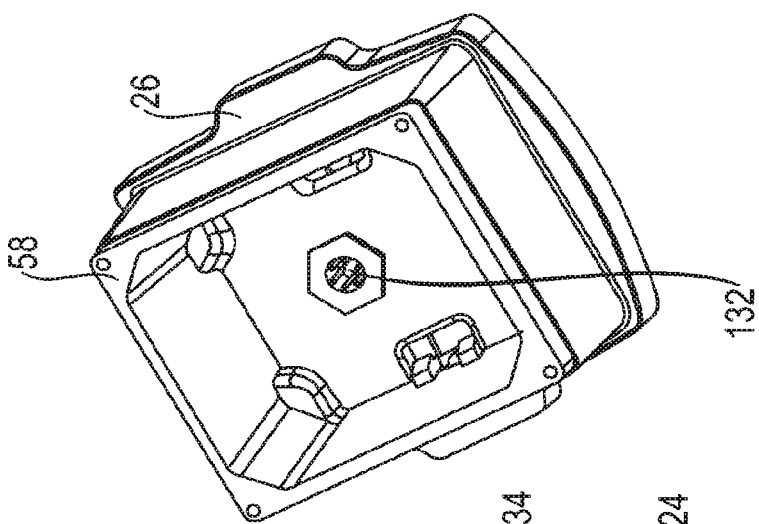
Figure 26A:
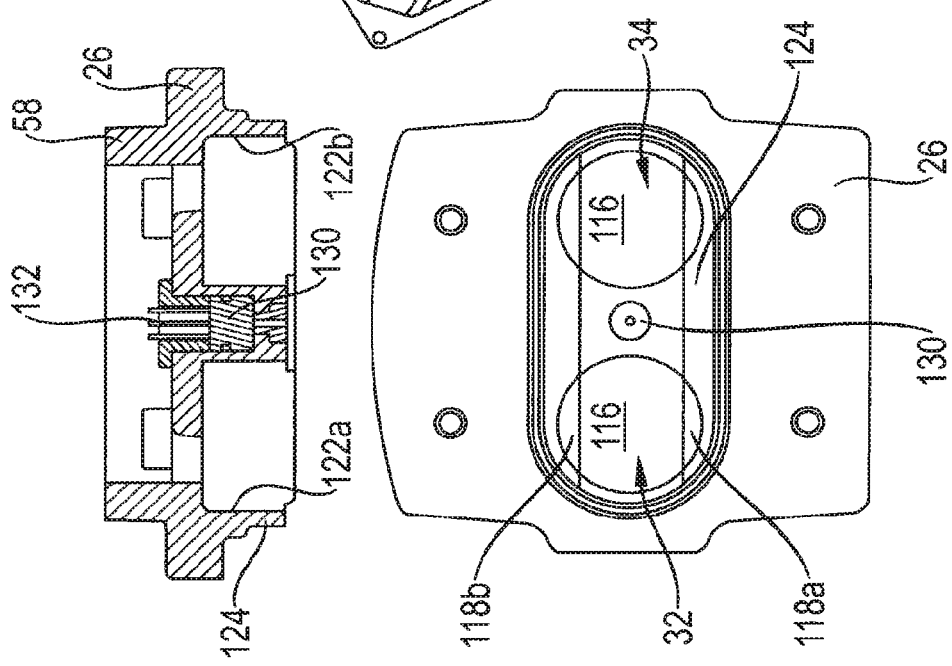
Figure 28:
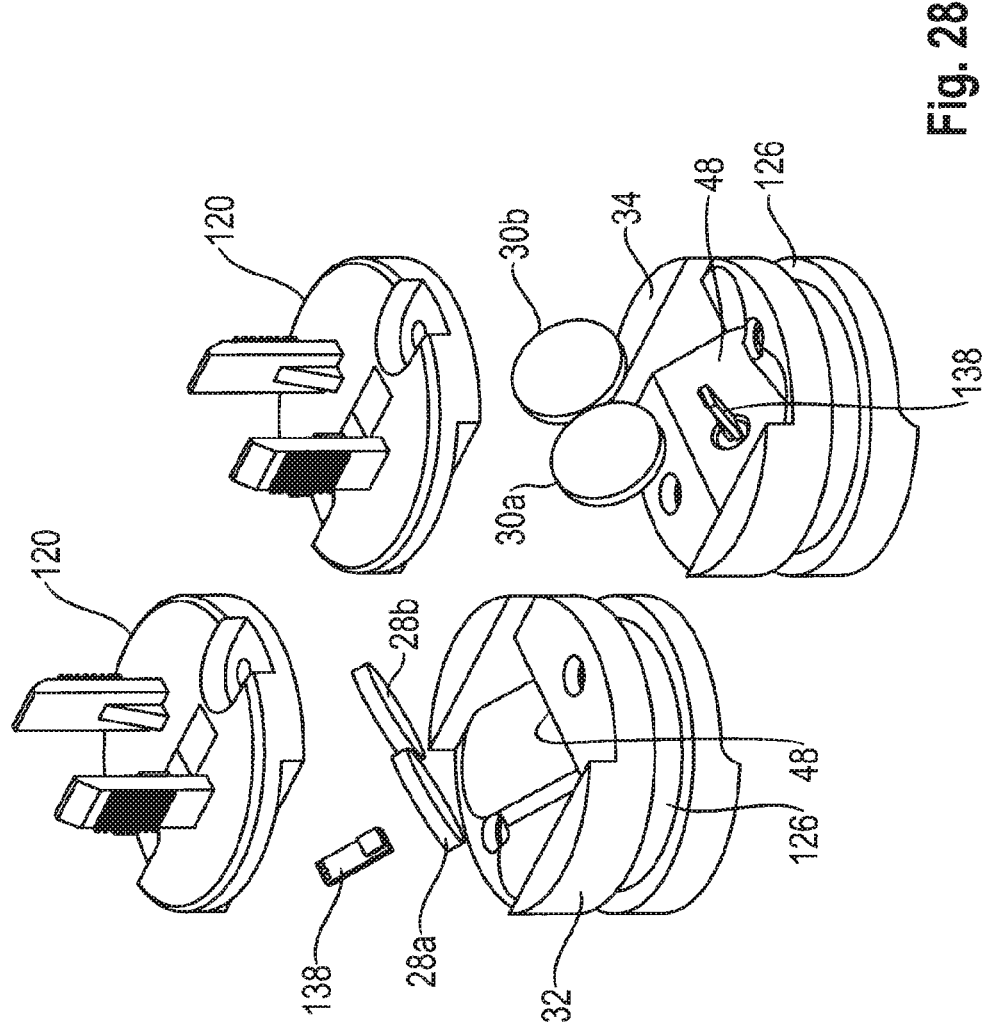
Figure 30A:
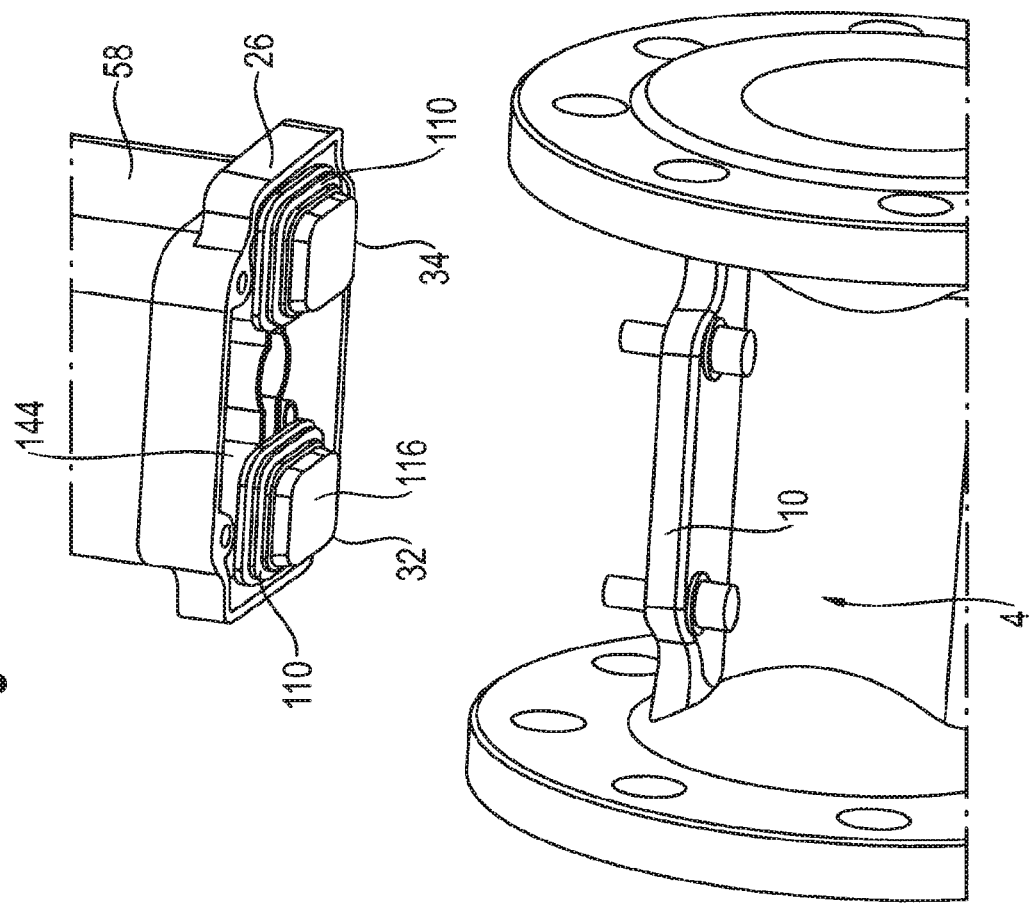
Figure 30B:
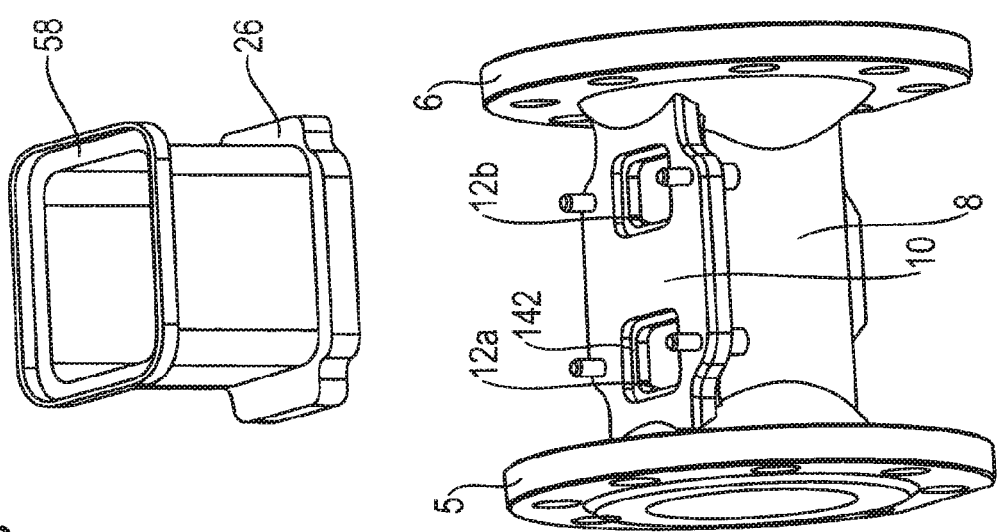
Figure 31B:
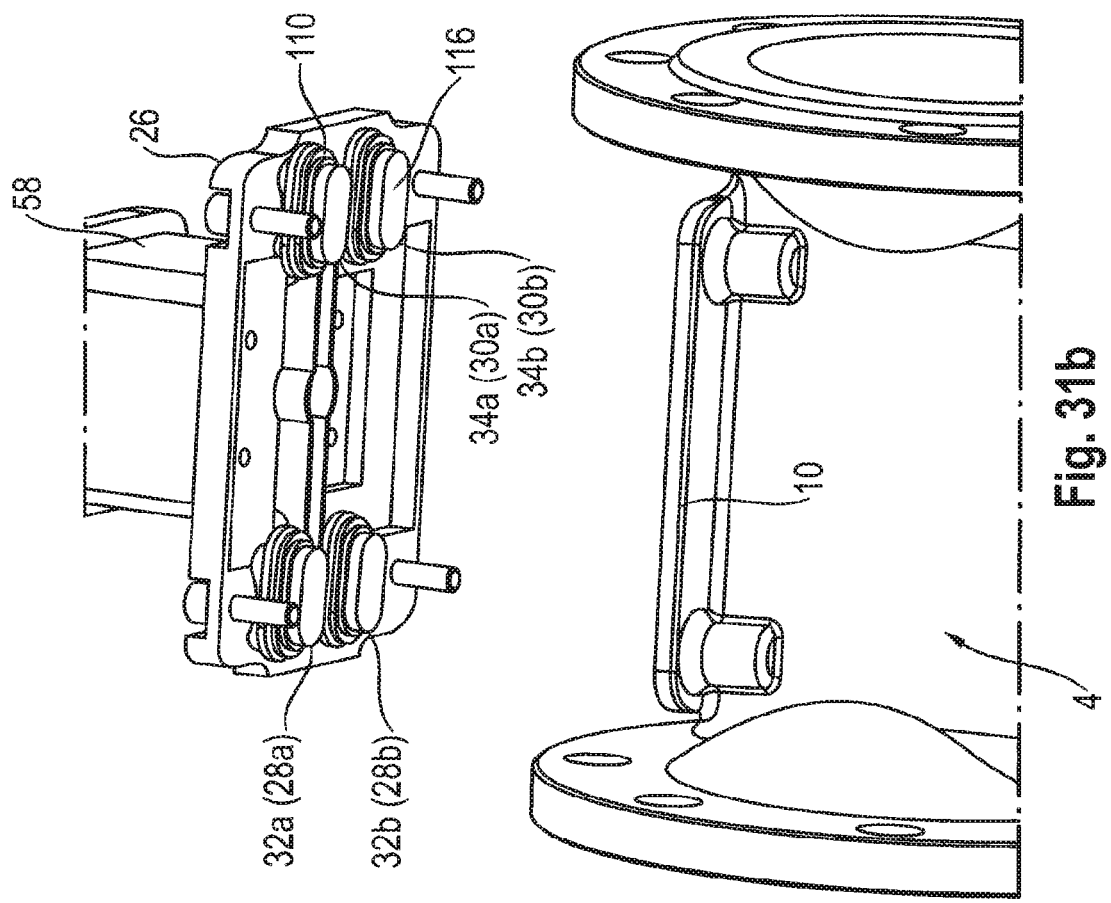
Figure 31A:
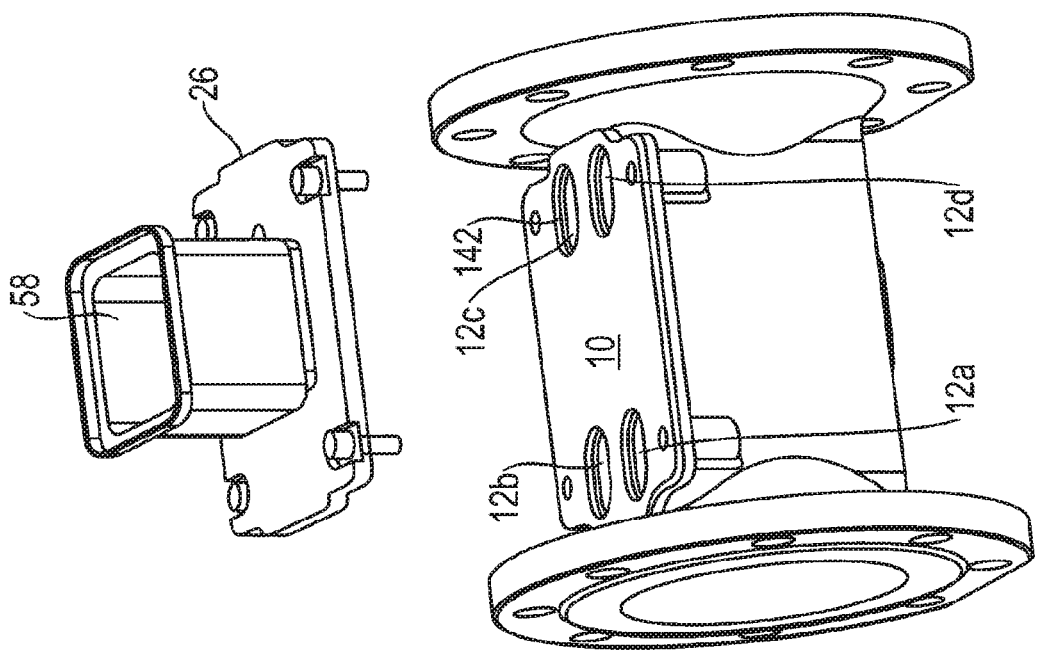
Figure 32B:
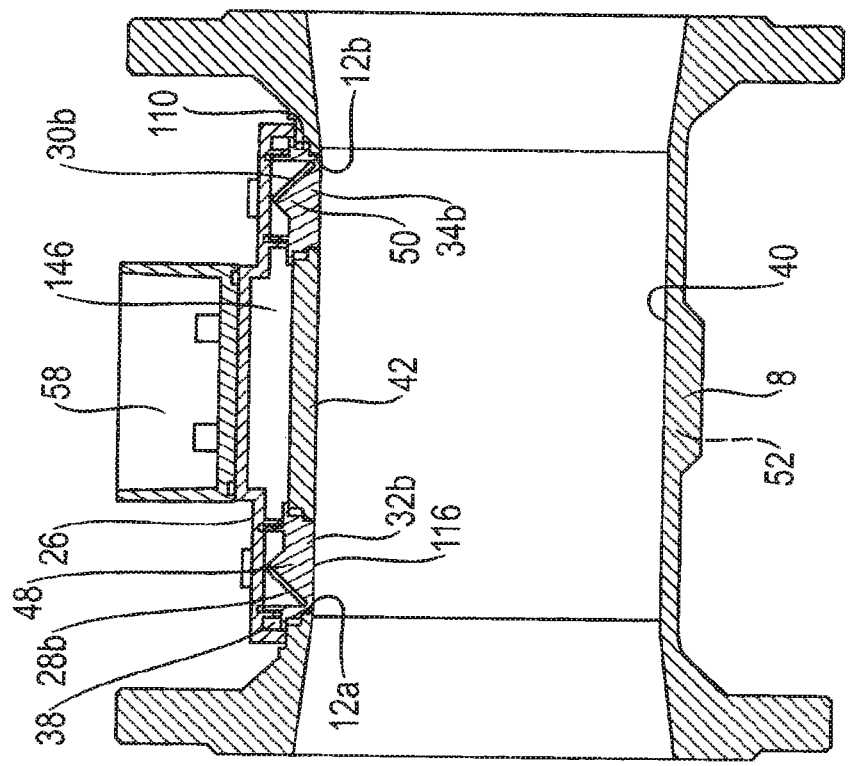
Figure 32A:
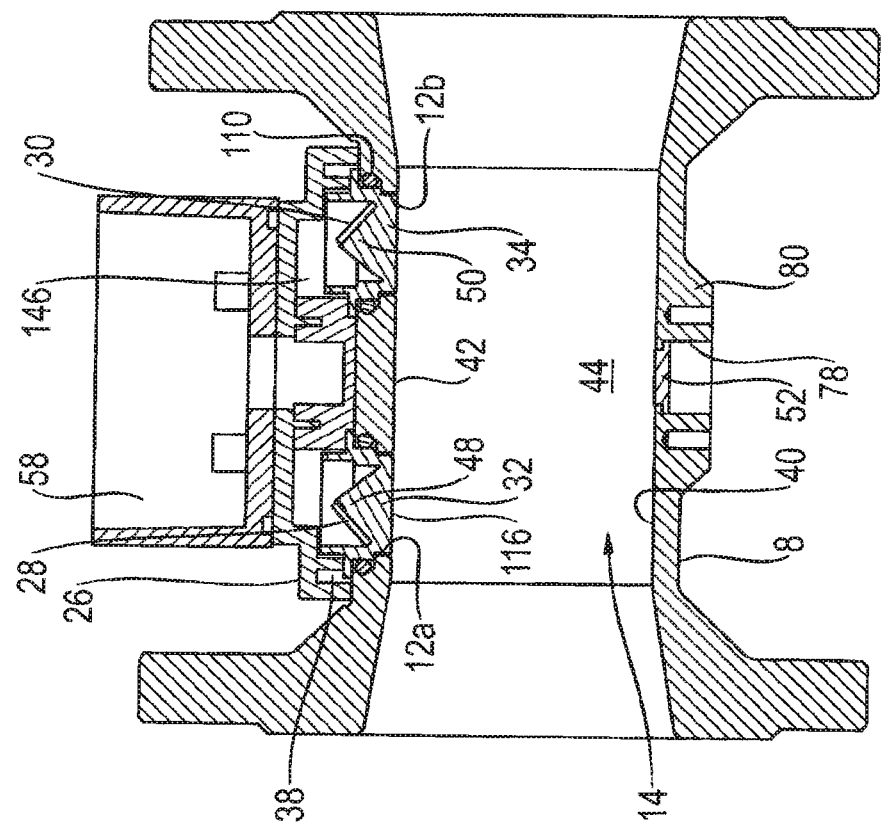

FIGS. 18a, 18b, and 19a, 19b show variations of a housing of a flow meter according to FIGS. 16a, 16b, 16c, 17a, 17b, 17c;

FIG. 20 shows a schematic diagram for explaining the structure of an ultrasonic transducer according to the disclosure;

FIGS. 21a, 21b, 21c, 21d show an example of a measuring insert for a housing according to FIGS. 19a, 19b;

FIGS. 22a, 22b, 22c, 22d show drawings of a measurement attachment for a housing according to FIGS. 18a, 18b;

FIG. 23 shows a variation of the example of a measurement attachment according to FIGS. 22a, 22b, 22c, 22d;

FIG. 24 shows a schematic diagram on the structure of a double sensor;

FIGS. 25a, 25b show schematic diagrams for explaining the course of the signal paths of a double sensor;

FIGS. 26a, 26b, 26c show an example of a flow meter with an additional sensor, e.g. a pressure sensor;

FIGS. 27a, 27b show drawings of a flow meter with an external sensor module;

FIG. 28 shows a variation of a double sensor with an additional sensor, e.g. a temperature sensor;

FIGS. 29a, 29b, 29c, 29d show drawings of three examples for reference paths for zero drift correction integrated into a coupling element;

FIGS. 30a, 30b show drawings of a further example of a flow meter with double sensors;

FIGS. 31a, 31b show drawings of a flow meter in which four single sensors are used instead of the double sensors, and FIGS. 32a, 32b show a comparison illustration of the flow meters of FIGS. 30a, 30b, 31a, 31b.

Figure 1:
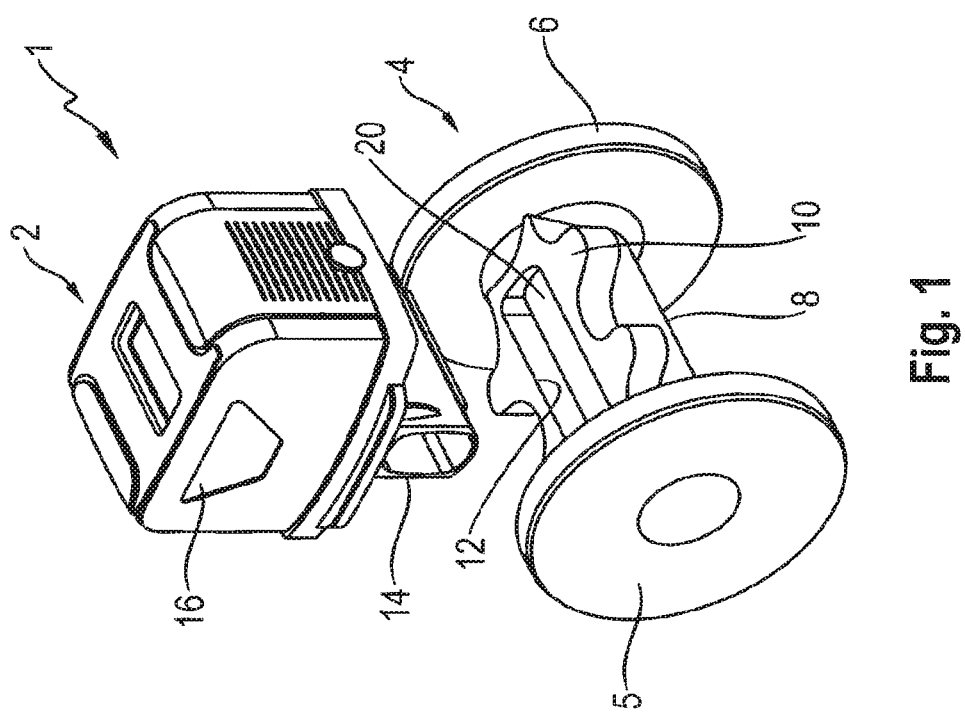
FIG. 1 shows a first example of a flow meter executed with a measuring insert.

FIG. 1 shows a first example of a flow meter 1 executed with a measuring insert 2. The flow meter 1 has a housing 4, which has two mounting flanges 5, 6, between which a pipe section 8 extends. This housing 4 is inserted into an installed pipe through which the medium/fluid flows whose flow is to be measured.

The pipe section 8 has an approximately tangentially arranged flange 10, which encompasses a recess 12. The actual measuring insert 2 has a measuring channel 14, to which a sensor system as described below is assigned.

The control electronics and power supply and other components of the flow meter 1 required for signal processing are accommodated in a measuring housing 16. Furthermore, a display for the measured flow which is not visible in FIG. 1 is provided on this housing. The measuring channel 14 is inserted through the recess 12 of the housing 4 into the cross-section of the pipe section 8 and the measuring housing 16 is then fixed at the flange 10.

Figure 2B:
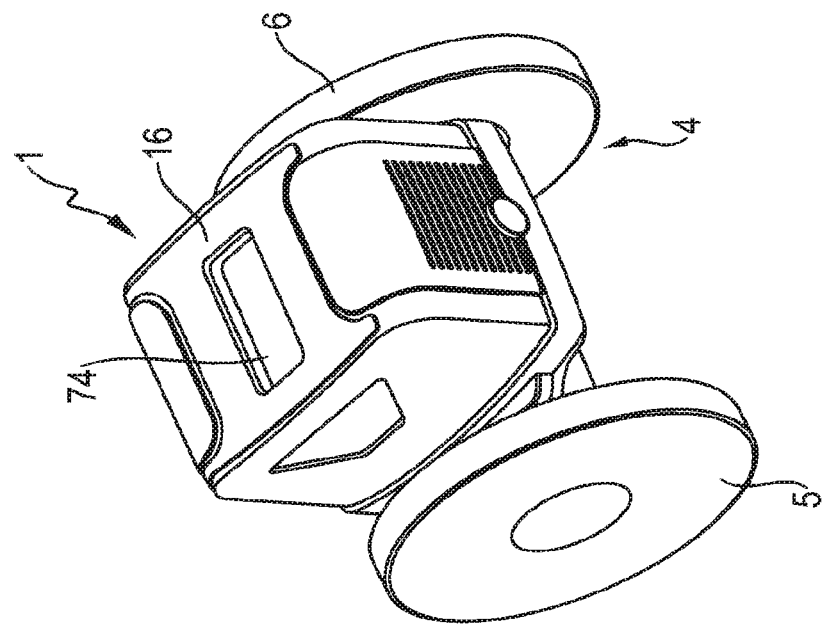
FIGS. 2a, 2b show further partial drawings of a flow meter according to FIG. 1.
Figure 2A:
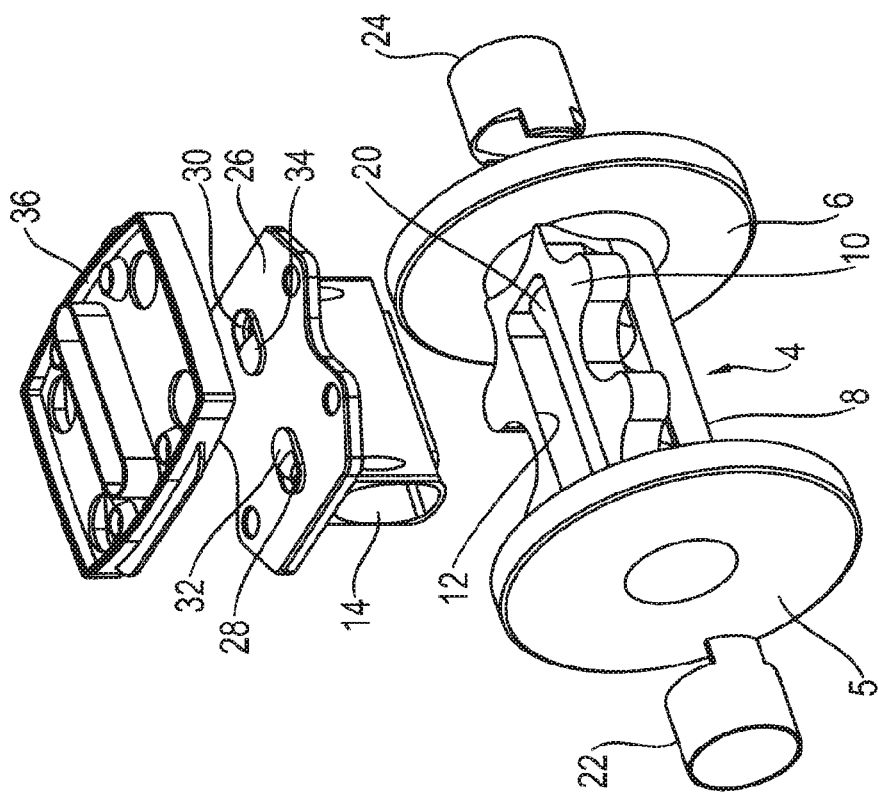

FIG. 2a) shows an exploded view of a part of the measuring insert of the flow meter according to FIG. 1, and FIG. 2b) shows the flow meter in the mounted state.

In the drawing according to FIG. 2a), the housing 4 is shown with the pipe section 8, which lies between the two mounting flanges 5, 6. Tangentially to the pipe section 8 (in FIG. 2a) pointing upwards) the flange 10 is formed, which encompasses the recess 12, through which the measuring insert 2, in particular the measuring channel 14, can be inserted into an interior space 20 of the pipe section 8.

For stream guidance in the inlet and outlet area, a lead-in and a lead-out body 22, 24 are inserted in the pipe section 8 or respectively in the mounting flange on the inlet and outlet side, wherein in the assembled state, these bodies establish a substantially fluid-tight connection to the measuring channel 14.

As explained in more detail below, this measuring channel 14 does not have a circular or rectangular cross-section, but is designed in an oval shape to reduce streaming stalls and turbulences. In the example shown, the measuring channel 14 is attached to a system adapter 26 of the measuring insert 2 or the measuring housing 16. This system adapter 26 is also provided with two ultrasonic transducers—hereinafter referred to as sensors 28, 30—which are arranged on coupling elements 32, 34, via which the ultrasonic signals are coupled into or out of the fluid.

FIG. 2a) at the top shows a housing bottom 36 of the measuring housing 16 mounted on the system adapter 26.

FIGS. 3a) and 3b) show the measuring channel 14, which in turn is attached to the system adapter 26. As indicated in FIG. 3a), the measuring channel 14 is surrounded in the connection area to the system adapter 26 by a circumferential sealing ring 38, which rests on the flange 10 in the mounted state. The system adapter 26 in turn is covered by the housing bottom 36.

This drawing shows that the measuring channel 14 made of plastic, for example, does not have a circular but an oval flow cross-section with a high axis h and a transverse axis q. The high axis h is longer than the transverse axis q. In the example shown, the ratio of the dimensions is h:q>1.2, preferably about 1.5. The ratio of the length of the high axis h to the width b shown in FIG. 3a) is (a:b)>1.5, preferably about 2.

The width b indicates the width of transverse walls 40, 42, which are designed as flat surfaces or slightly concavely curved walls. In the direction of the high axis h, side walls 44, 46 extend, which together with the transverse walls 40, 42 define an approximately oval cross-section of the measuring channel 14. This ovalized, rounded cross-section form reduces streaming stalls and turbulences as compared to the conventional right-angled or circular channel cross-sections, whereby the signal propagation and the signal path are increased by the large height extension h and the streaming speed can be significantly increased as compared to the inlet area and outlet area by the comparatively small width q, b in the transverse direction. It is a prerequisite that the lead-in body 22 and the lead-out body 24 have a cross-section that is smaller than the cross-section of the measuring channel through which the current flows, so that a corresponding increase in velocity occurs.

FIG. 3c) shows the arrangement according to FIG. 3a) in a three-dimensional representation in a slightly different view. As mentioned, the measuring channel 14 with the oval measuring channel cross-section is made of plastic and is surrounded by the sealing ring 38 attached to the system adapter 26. In the system adapter 26, the two coupling elements 32, 34 are arranged, of which only the coupling element 32 is visible in the drawing according to FIG. 3c). In this drawing, it can be seen that the coupling element 32 is inserted flush into the flat or slightly curved transverse wall 42 on the sensor side, so that the measuring channel 14, or more precisely its circumferential wall, is largely smooth with rounded transitions.

FIG. 3d) shows a plan view of the arrangement according to FIG. 3c), wherein the lead-in body 22 and the lead-out body 24 are attached to the measuring channel 14. According to this drawing, the two coupling elements 32, 34 protrude slightly upwards beyond the large surface of the system adapter 26 visible in FIG. 3 towards the housing floor 36 which is not shown. As will be described in more detail below, each coupling element 32, 34 has a coupling wedge 48, 50 to which—as will be explained in more detail below—the sensor is attached. The wedge angle of the coupling wedge 48, 50 is selected such that the ultrasonic signals generated by the sensor 28, 30 are coupled obliquely into the measuring channel 14.

As shown in FIGS. 3a), 3b), the measuring channel 14 or the stream cross-section provided in it can be aligned in such a way that its high axis h is set obliquely to the direction of gravity. In this way, an interference of the measuring signals due to sedimentations, air bubbles or the like is prevented. This inclination is possible in all examples described. As mentioned at the beginning, a horizontal arrangement is also possible, whereby the high axis of the oval profile is then arranged transversely to the direction of gravity.

FIG. 4 shows a variation in which the flow meter 1 is executed according to the "measurement attachment" concept. The two coupling elements 32, 34 are inserted directly into the transverse wall 42. The measuring channel 14 in turn flows via the lead-in and lead-out bodies 22, 24 into the two external mounting flanges 5, 6. In this example, the measuring channel 14 is thus formed directly by the pipe section 8, whereas in the example according to FIGS. 1 to 3, the measuring channel 14 is inserted into the pipe section 8. The ovalized cross-section of the measuring channel 14 is also provided for the example shown in FIG. 4, whose high axis is set obliquely to the direction of gravity for the example shown—this is particularly clearly shown in FIGS. 4b), 4c) and 4d). According to FIG. 4a), the two coupling elements 32, 34 are—as explained above—inserted into corresponding recesses of pipe sections 8 and each have a coupling wedge 48, 50 on which the respective sensor 28, 30 is supported. These sensors can, for example, be formed by a piezoceramic, which is contacted via electrodes with the control accommodated in the measuring housing 16.

The angle of inclination of the coupling wedge 48, 50 is formed in such a way that the signals coupled into or respectively out of the measuring channel 14 by the two sensors are inclined approximately V-shaped to each other. The signal guidance is not limited to such a V-shape. For example, the signal path can also be W-shaped, whereby the measurement signal is then redirected from a first, opposite reflector back to another reflector, which is arranged between the two sensors. The signal is then directed from this reflector in the direction of a third reflector, which in turn is arranged on the opposite side and via which the measurement signal is reflected to the other sensor. The latter reflector is arranged in the same way as the first reflector. The central reflector on the sensor side can then be located at the measuring channel or at the measurement attachment/measuring insert. Sealing of the coupling elements 32, 34 in the measuring channel 14 is carried out via sealing rings which are not shown.

In the drawing according to FIG. 4b), it is again clearly visible that the fluid-side coupling surfaces of the two coupling elements 32, 34 are inserted flush into the corresponding transverse wall 42, so that the measuring channel 14 is surrounded by smooth circumferential walls.

FIG. 4c) shows the measuring channel in a view from above, so that the transverse wall 40 opposite the coupling elements 32, 34 is visible. In this plane or slightly rounded transverse wall 40, a reflector 52 is inserted which lies at the vertex of the V formed by the two sensor axes. The signal path extends, for example, from a sensor 28 via the coupling element 48 into the cross-section of the measuring channel 14 towards the reflector 52. The measurement signal is then reflected from reflector 52 to the other sensor 30, whereby the reflected signal is guided via the associated coupling element 34 and coupling the wedge 50 to sensor 30.

FIG. 5 shows a variation of an example with "measuring insert". This drawing (see FIG. a)) shows the housing 4 described above with the two mounting flanges 5, 6, between which the pipe section 8 with the flange 10 extends. The measuring channel 14 shown in FIG. 5d) is inserted into the recess 12 of the housing 4 surrounded by the flange 10. This channel, in turn, has a pocket-shaped accommodation 56 in which a measuring bar 54 (FIG. 5b) is inserted. This one-piece measuring bar 54 replaces the aforementioned structure with two coupling elements and the associated sensors. As shown in FIGS. 5d) and 5b) in particular, the measuring channel 14 has a console 57 encompassing the accommodation 56 with which it is attached to the system adapter 26.

Figure 5A:
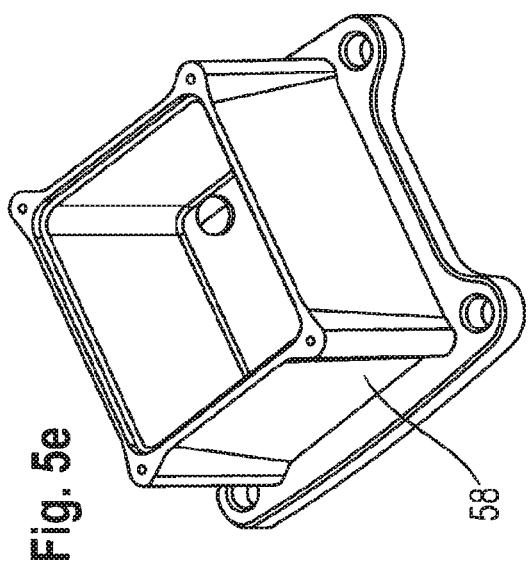
FIGS. 5a, 5b, 5c, 5d, 5e, 5f show a further example of a flow meter, wherein a measuring channel is formed by a measuring insert.
Figure 5F:
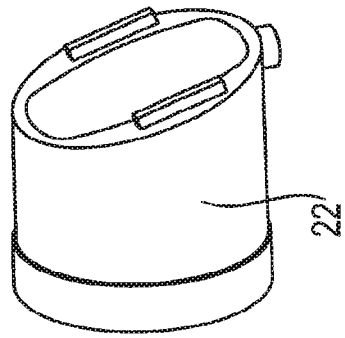
Figure 5C:
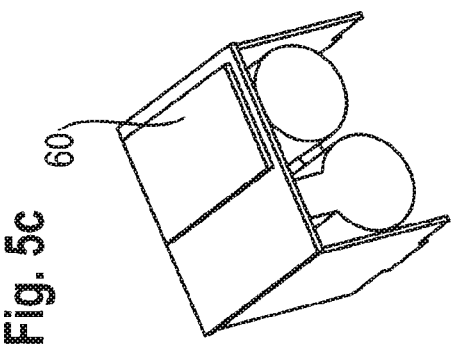
Figure 5E:
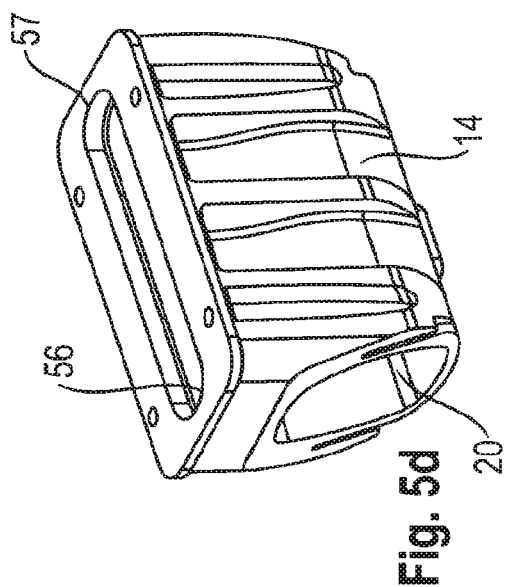
Figure 5D:
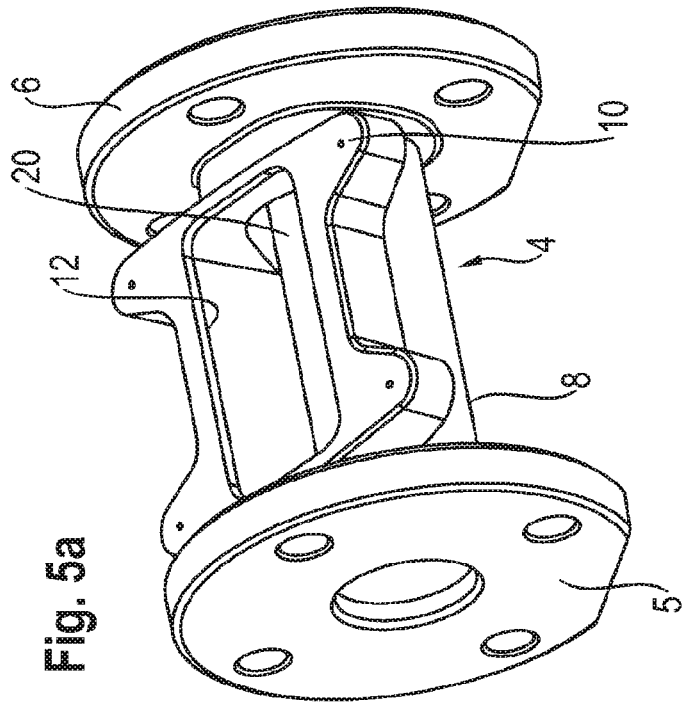
Figure 5B:
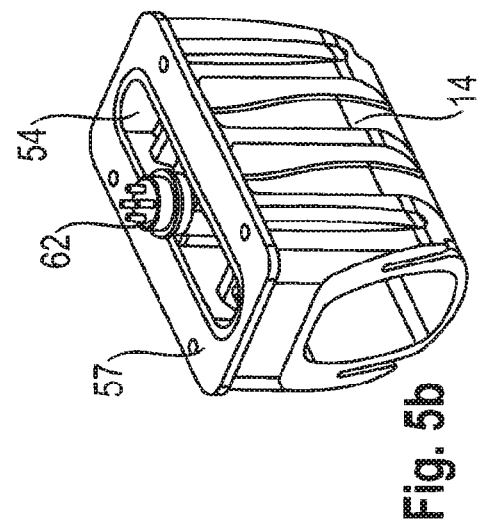

In the example shown in FIG. 5e), the system adapter 26 has a control housing frame 58, which forms part of the measuring housing 16 and in which an electronic module 60 shown in FIG. 5c) is inserted, which contains all electronic components for power supply and signal processing. This electronic module 60 is connected to the sensors 28, 30 via a connector 62 arranged on the measuring bar 54.

FIG. 5f) shows the lead-in body 22, which is attached to the measuring channel 14 in a substantially fluid-tight manner. The lead-out body 24 has a corresponding structure. As can be seen from this drawing, the end section on the measuring-channel side of the lead-in body 22 is adapted to the oval profile of the measuring channel 14 with regard to the cross-section profile. As a result, streaming is already accelerated within the lead-in body 22, since the cross-section tapers from the circular input cross-section to the oval measurement cross-section.

FIGS. 6a), 6b) show detail drawings of the measuring bar 54 inserted into the accommodation 56. It is made of plastic, e.g. PSU, PEEK, PEI or another suitable material and is inserted fittingly into the accommodation 56 of the measuring channel or more precisely into the console 57. The two sensors 28, 30, which are designed as piezo elements/piezoceramics, are attached to coupling wedges 48, 50, which are integrally formed on the measuring bar 54. As can be seen in particular from FIG. 6b), the measuring bar 54 is pot-shaped. In the space surrounded by the measuring bar 54, a printed circuit board 64 is arranged, which is connected to the connector 62 on the one hand and to the two sensors 28, 30 on the other hand for power supply and signal transmission. As can be seen in the drawing according to FIG. 6a), connector 62 is sealed by a seal 66 in the control housing. The space surrounded by the measuring bar 54 is then filled with a casting compound 68, so that the sensors 28, 30, the printed circuit board 64, the corresponding contacts, etc. are embedded and fixed in a fluid-tight manner.

As shown in FIG. 6b), a reference path 70 is formed in the measuring bar 54 between the two coupling wedges 48, 50 inclined towards each other. The signal emitted by one sensor 28 can in principle move along two signal paths to the respective other sensor 30. One signal path runs along the reference path 70 shown in FIG. 6*b*) through the measuring bar 54 directly to the adjacent sensor 30. The other signal path 72 runs along a comparatively short path in the measuring bar 54 and is then coupled into the medium via this path. This signal path 72 continues to the reflector 52 (not shown in FIG. 6) and from there towards the other sensor 30, wherein the signal from the fluid is coupled into the measuring bar 54 and then hits the sensor 30 along a relatively short path through the measuring bar 54.

The reference path 70 provides the measuring electronics with a reference signal that is independent of the flow of the fluid and can therefore be used for zero drift correction.

FIGS. 7 to 11 explain further variations of the example according to FIGS. 5, 6. FIG. 7 shows two concrete examples of flow meters 1, which are executed according to the principle "measurement attachment". FIG. 7*a*) shows a flow meter 1 with the housing 4, to which the measuring housing 16 with the control electronics, the counter and a digital display 74 shown in FIG. 7*a*) is attached. FIG. 7*b*) shows a variation in which communication modules 76 are additionally attached to the measuring housing 16, which can be used, for example, to establish a wireless signal transmission to a computer, a mobile readout station, a connection to sensors or the like.

Figure 8D:
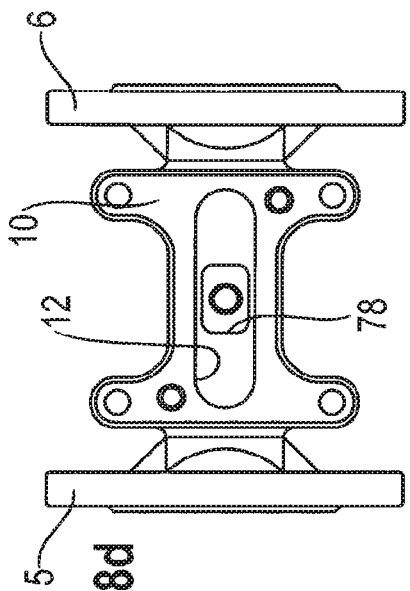
FIGS. 8a, 8b, 8c, 8d, 8e show views of a housing of the flow meter according to FIGS. 7a, 7b.
Figure 8E:
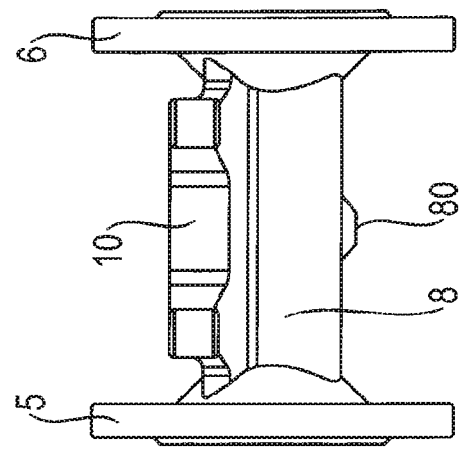
Figure 8C:
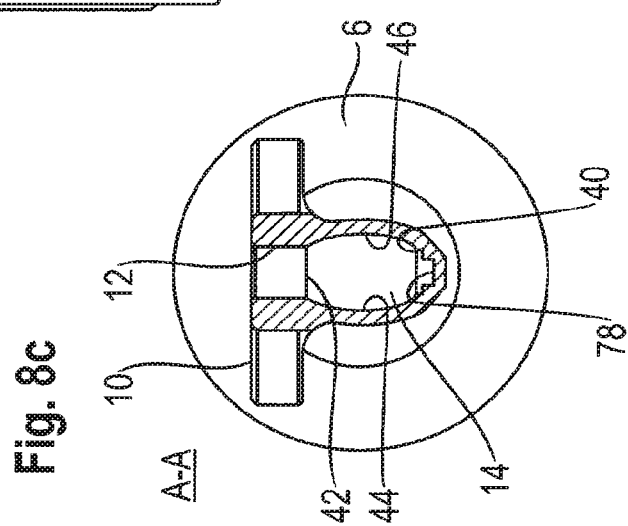
Figure 8A:
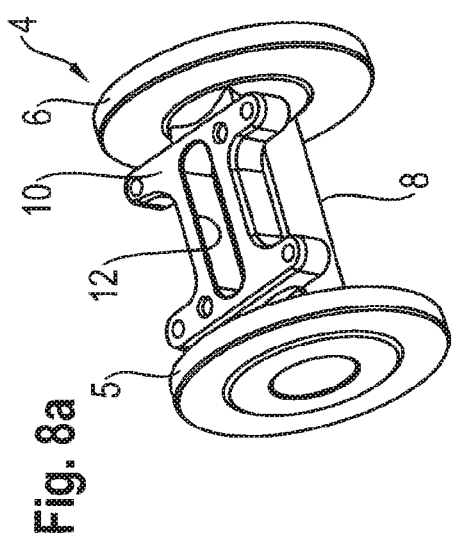

FIGS. 8*a*) to 8*e*) show the basic structure of the housing 4. Since the basic structure of the housing 4 largely corresponds to that of the housings described above, only a few design features are explained and for the rest reference is made to the above explanations on the housing structure.

FIG. 8*a*) shows a three-dimensional drawing of the housing 4 with the two mounting flanges 5, 6 and the pipe section 8 in between, on which the tangentially running flange 10 is arranged. This encompasses recess 12, into which the measuring insert, in the present case the measuring bar 54, is inserted in a fluid-tight manner.

Figure 8B:
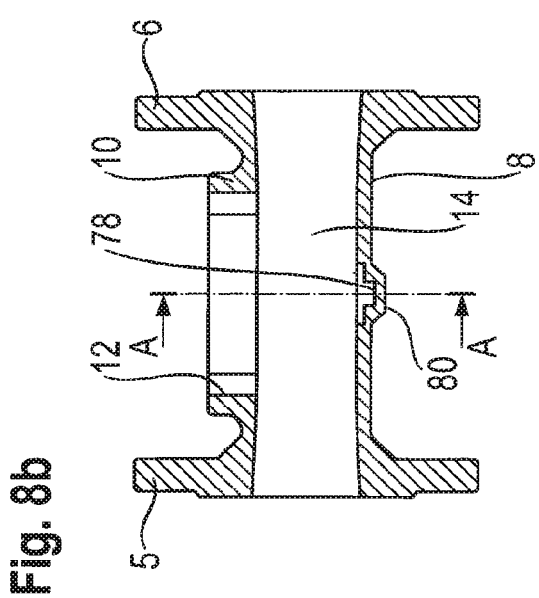

FIG. 8*b*) shows a longitudinal section through the housing 4 according to FIG. 8*a*). It can be seen in this drawing that recess 12, which penetrates the flange 10, leads into the measuring channel 14 limited by the pipe section 8.

Diametrically to recess 12, a pocket 78 is formed in measuring channel 14, into which the reflector 52 described above is fittingly inserted, preferably pressed. FIG. 8*c*) shows a section along the line A-A in FIG. 8*b*). In this drawing, the pocket 78, which leads into the transverse wall 40 of the measuring channel 14 below, is clearly visible. The recess 12 leads in a corresponding way into the transverse wall 42 at the top. The reflector 52, which is not shown, is inserted into pocket 78 through the recess 12 in this example.

Usually, the housing 4 is powder coated. However, the powder coating is preferably not formed in the area of the pocket 78, so that the press fit can be produced with high accuracy. The Applicant reserves the right to base an independent claim on this press fit.

FIG. 8*d*) shows a top view of the housing 4. This drawing clearly shows the pocket 78 which can be reached through the recess 12. Also clearly visible is the H-shaped sealing surface of the flange 10 with the fastening recesses, via which the measuring housing 16 is fastened to the flange 10.

FIG. 8*e*) shows a side view of the measuring housing 4. A radially protruding projection 80 in which the pocket 78 is formed is clearly visible. This projection 80 is diametrically opposed to the flange 10.

FIG. 9 shows a detail drawing of the measuring housing 16 of the example shown in FIG. 7*a*). Accordingly, the housing has the already described system adapter 26, which is formed in one piece with the control housing frame 58, which in turn accommodates the electronic module 60 and the digital display 74. The measuring housing 16 is closed off by a housing cover as seen by the viewer in FIG. 9.

As explained above, the measuring bar 54 is mounted on system adapter 26 and designed to be flush with recess 12 of the housing 4 (see FIG. 8).

FIG. 10 again shows an exploded view of the measuring housing 16. As explained, this consists in principle of the system adapter 26 with the control housing frame 58. The electronic module 60 is inserted into the control housing frame 58 and with the measuring bar 54 contacted via connector 62. The electronic module 60 contains the digital display 74 described above, the counter and the other components required for signal processing and power supply. The digital display 74 is then covered by a transparent pane 84 and fixed to the control housing frame 58 via the housing cover 82.

The example explained on the basis of FIGS. 9 and 10 has an exchangable battery pack 86 which can be inserted into the measuring housing 16. For this purpose, the control housing frame 58 is formed with a battery supply opening 88, through which the battery pack 86 can be inserted into a holder 90 of the electronic module 60. This holder 90 then has corresponding contacts so that the electronic components are supplied with power via the battery pack 86.

Figure 11:
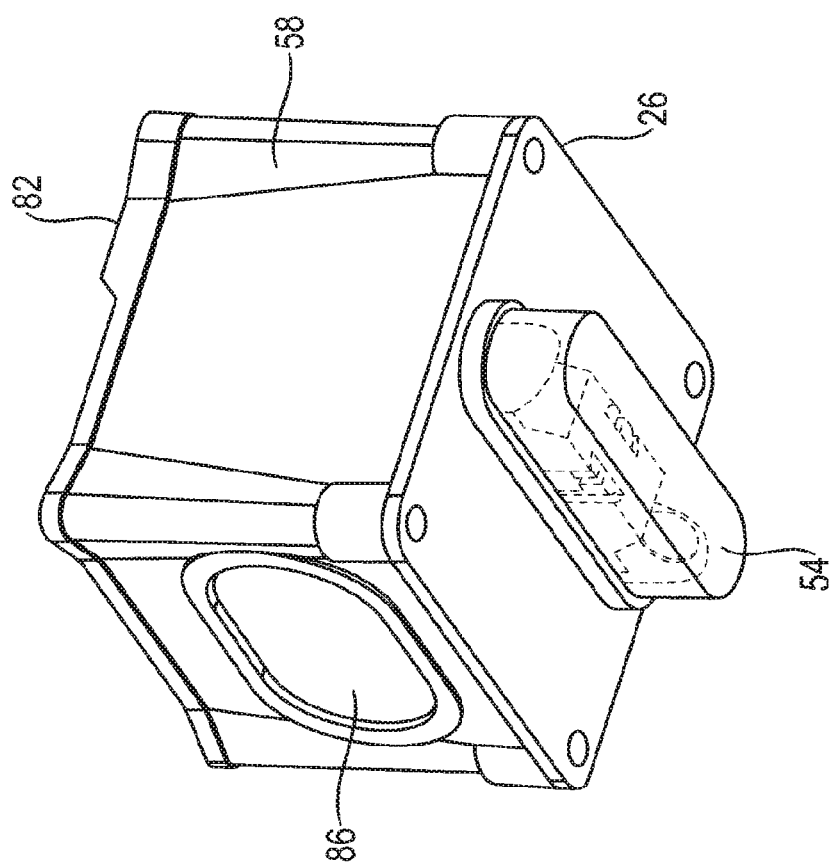
FIG. 11 shows a further view of the measuring insert according to FIG. 10 with a detail drawing of the measuring bar according to FIGS. 6a, 6b.

FIG. 11 shows a view from below of the measuring housing 16 according to FIG. 9. In this drawing, the battery pack 86 is inserted into the control housing frame 58 and thus also into the electronic module 60. The measuring bar 54 protrudes downwards from the system adapter 26.

Figure 13:
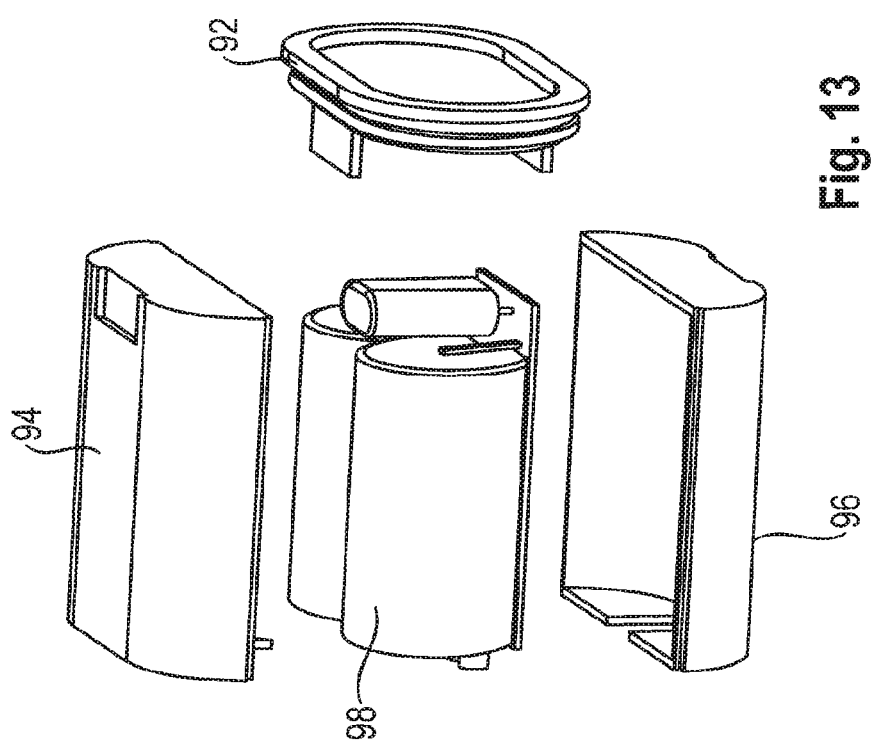
FIG. 13 shows an exploded view of the battery pack according to FIG. 12.
Figure 12:
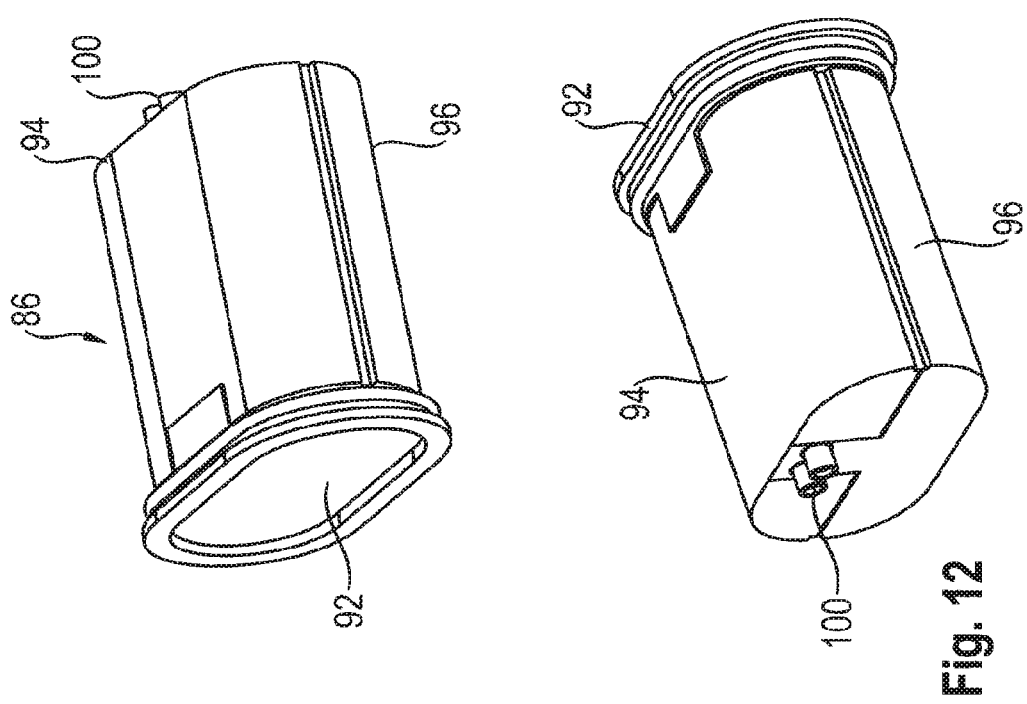
FIG. 12 shows views of a battery pack of a flow meter according to the disclosure.

FIG. 12 shows again two detailed views of the battery pack 86, which has a lid 92 with two shells 94, 96 shown in FIG. 13, forming an enclosing housing for the actual battery block 98. The contacts 100 for contacting the electronic module 60 protrude from the front face of the housing remote from the lid 92.

FIG. 14 shows a variation of the examples described above in which the measuring channel 14 formed by the pipe section 8 is not oval but trapezoidal in the broadest sense. The measuring channel 14 has—similar to the examples described above—two side walls 44, 46, which extend between a sensor-side transverse wall 42 and a lower transverse wall 40. The two side walls 44, 46 are arranged approximately V-shaped to each other, so that the width B of the transverse wall 42 is clearly larger than the width b of the transverse wall 40. Due to this approximately trapezoidal geometry, a cross-sectional narrowing occurs in turn in the direction of the transverse axis, while in the direction of the upright high axis a signal path is created that is larger than a circular cross-section.

As shown in FIG. 14, the reflector 52 is inserted in the area of the narrower transverse wall 40 lying below. The wider transverse wall 42 at the top is designed with flange 10, to which a measurement attachment 2 with two single or double sensors 28, 30 can be attached. The basic structure of each of the measurement attachments or measuring inserts described can be used.

Figure 15A:
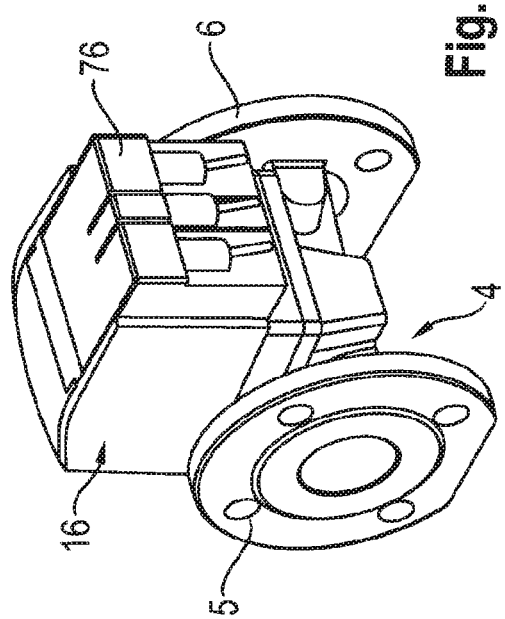
FIGS. 15a, 15b and 15c show views of a further example of a flow meter with a measurement attachment.
Figure 15C:
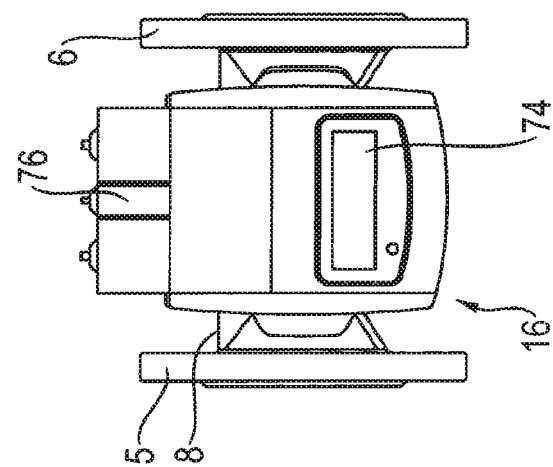
Figure 15B:
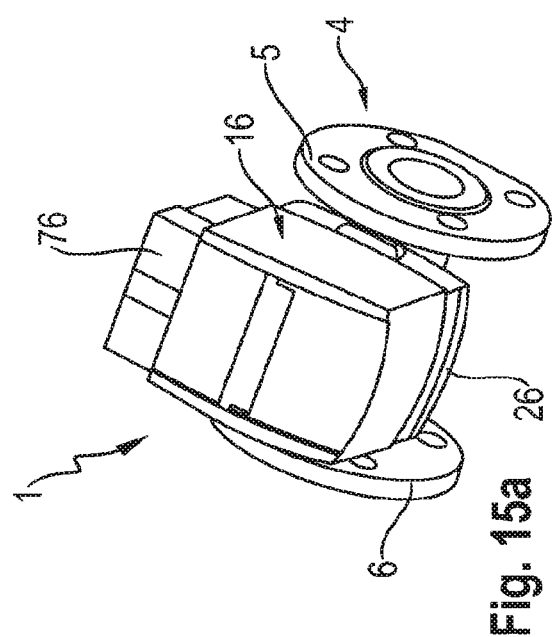

In FIGS. 15*a*) to 15*d*) further examples of flow meters 1 are shown. FIGS. 15*a*), 15*b*) and 15*c*) show different views of a flow meter 1 in which the sensor system is designed as a measurement attachment. As with the examples described above, a measurement attachment 2 with a measuring housing 16 is attached to the housing 4 with the two mounting flanges 5, 6, with one or more communication modules for signal transmission attached to it.

Figure 15D:
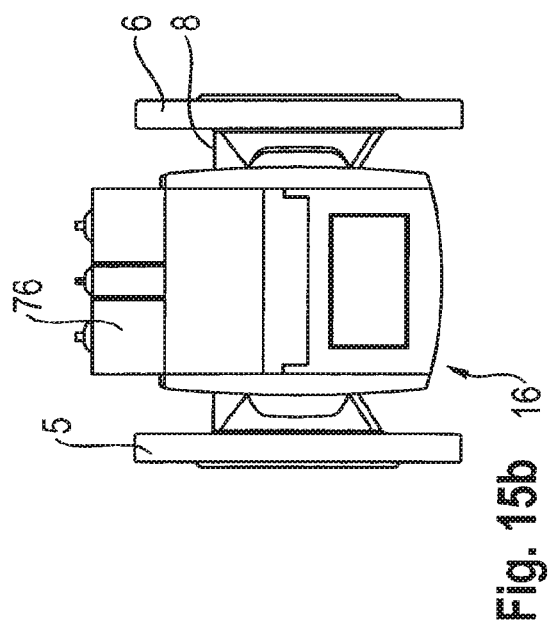
FIG. 15d shows a variation of the example according to FIGS. 15a, 15b, 15c.

FIG. 15d) shows a variation with a digital display 74.

The examples shown in FIG. 15 are in principle made up of two main components, the measuring housing 16 shown in FIG. 16a) and the housing 4 shown in FIG. 16b). The measuring housing 16 is designed as a measurement attachment and is attached to the flange 10 of the housing 4. This assembly process is shown schematically in FIG. 16c). This drawing shows the two sensors 28, 30, which are inserted in the openings/recesses of flange 10 explained in more detail below.

Depending on the case of application, other modules can be attached to the measuring housing 16—as explained above—for example the L-shaped communication modules 76 explained above (see FIG. 17a)). This attaching is shown in FIG. 17b). In the example shown, the measuring housing 16 is designed with a swiveling cover 102, which can be opened to insert the communication modules 76 or other modules, so that they can be inserted into corresponding slots and contacted with the electronic module 60. After this insertion, the cover 102 is closed (see FIG. 17c)) so that the communication modules 76 or other modules/components are fixed in position and contacted if necessary.

On the basis of FIGS. 18 and 19, two basic possibilities of the design of the housing 4 are explained.

Both housing variations do not differ in the geometry of the measuring channel 14, which is again designed as an oval profile. This oval profile is shown in the common side view (c)) with the two variations (FIGS. 18, 19).

In the example of the housing 4 shown in FIG. 18, the flange 10 is designed with a single recess 12 into which the measuring insert with the sensor system is inserted. As shown in FIG. 18a), the reflector 52 is mounted through the recess 12, whereby the reflector 52 is then inserted—similar to the example in FIG. 8—into a pocket 78 of the pipe section 8. This pocket 78 can again be formed in a projection 80.

FIG. 19 shows a variation in which not a single recess but a separate recess 12a, 12b is provided for each sensor 28, 30, into each of which a sensor 28, 30 is inserted, the basic structure of which is explained using FIG. 20. With these relatively small recesses 12a, 12b, it is difficult to mount the reflector 52 through these recesses. For this reason, it is preferred with such an example to design the projection 80 with the pocket 78 open towards the outside, so that the reflector 52 can be inserted into the pocket 78 from the outside. Sealing is then carried out using a sealing cap 104.

As with the examples described above, the measuring signals are coupled in and out via an upper, preferably flat or slightly curved transverse wall 42, with the sensors inserted flush into the wall. The reflector 52 is inserted in a corresponding manner into the opposite transverse wall 40, which is spaced from the sensors.

FIG. 20 shows the basic structure of the sensors 18, 20 as it can be used with the examples described above. Each sensor 18, 20 is held in a coupling element 32, 34. As previously explained using the measuring bar 54, each coupling element 32 has a coupling wedge 48 with the respective sensor 18 at its inclined wedge surface.

Like the measuring bar 54, the coupling element 32 and the coupling wedge 48 are made of a suitable plastic such as PEEK, PSU or PEI. Of course, other materials can also be used which fulfill the following criteria: the material should enable signal transmission with a stable sound velocity in the range from 2000 to 2400 m/s, the temperature influence should be as small as possible or at least linear, the material should have a low coefficient of linear expansion, the material should have sufficiently good adhesive and casting properties and should also have low water absorption or only a slight change in the relevant properties due to water absorption. In addition, the material should be suitable for use in drinking water environments and be comparatively inexpensive.

In the example shown, the coupling element 32 is approximately pot-shaped, whereby an accommodation chamber 106 is filled with a casting compound or the like. A ring flange 108 is provided on the outer circumference of the coupling element 32, which in the assembled state stretches over an O-ring 110, so that the coupling element 32 can be inserted in a sealing manner into an accommodation in the housing 4 or in the measuring housing 16. The acoustic and mechanical coupling of the sensor 18 to the coupling wedge 48 is carried out via a grease, gel, silicone pad and/or adhesive. This layer is marked in FIG. 20 with the reference sign 112. The contact of the sensor, i.e. of the piezoceramic for example, is made via two electrodes 114a, 114b, whereby the lower electrode 114b, which is on the coupling wedge side, is led upwards on one side to the other electrode 114a, so that contacting is simplified from above.

On the basis of FIG. 21, the structure of a measurement attachment 2 for a housing according to FIG. 19 is explained. As described above, this example of a housing 4 has two individual recesses 12a, 12b (see FIG. 21d)), into each of which a sensor 28, 30 with the associated coupling element 32, 34 is inserted in a sealing manner. As shown in FIG. 21d), the two coupling elements 32, 34 with the sensors 28, 30 integrated therein but not shown as well as the two O-rings 110 are inserted individually into the respective recesses 12a, 12b and sealed there by means of the O-rings 110. The measuring housing 16 is then placed onto the flange 10, whereby the sealing ring 38 is arranged between the system adapter 26 of the measuring housing 16 and the flange 10 and encompasses the two sensors 28, 30 with the coupling elements 32, 34, so that the electronic module 60 is also sealed towards the fluid. As shown, for example, in FIG. 20b), the coupling element 32 ends in a flush manner with the transverse wall 42 of the measuring channel 14. In the example explained in FIG. 21, this transverse wall is basically formed by the flange 10 of the housing 4. For small nominal widths, it can happen that the coupling element 32, 34 has a slightly larger diameter than the width of the transverse wall 42, so that the edge areas of the coupling element 32, 34 extend as far as into the side walls 44, 46. In such a geometry it can be advantageous if—as in the example according to FIG. 21a), 21c), 21d)—the areas of a coupling surface 116 formed in the transition area to the side walls 44, 46 are formed with protrusions 118a 118b (see FIG. 21c)) extending to the side walls 44, 46, whereby these protrusions 118a, 118b run flush into the side walls 44, 46, so that the coupling elements 32, 34 are fitted accurately, without overhang or dug-out in the circumferential walls of the measuring channel 14.

The position fixing of the coupling elements 32, 34 in the measuring housing 16 in the example shown in FIG. 21 is carried out via fixing elements 120 (see FIG. 21c, 21a)), which on the one hand encompass the coupling elements 32 or 34 and on the other hand are attached to the system adapter 26. As explained above, in this example the reflector 52 is mounted from the outside, whereby it is inserted into the pocket 78 of the housing 4, which is open towards the outside.

A disadvantage of the direct fixation of the sensors 28, 30 and coupling elements 32, 34 in housing 4 is that the latter has a comparatively complex structure and therefore places relatively high demands on the production, especially the casting.

In the example according to FIG. 22, a housing according to FIG. 18 is used, which is easy to produce and in which the sensor system is inserted into a single large recess 12 of the flange 10. In the example shown in FIG. 22, the measuring housing 16 has a plate-shaped sensor accommodation 121, e.g. made of plastic, which is connected to the system adapter 26 on the one hand and has two recesses 122a, 122b (see FIG. 22d) on the other hand, into each of which a coupling element 32, 34 is inserted in a sealing manner. This sealing is performed using O-rings 110 again. As shown in FIG. 22b) in particular, the coupling elements 32, 34 are flush with the surface of the sensor accommodation 121 on the measuring channel side when mounted. This surface thus forms part of the transverse wall 42 of the measuring channel 14—for this reason, this surface is also given the reference sign 42 in FIG. 22b). When mounted, the sensor accommodation 121 immerses into the recess 12 of the flange 10 and is sealed there by an additional ring-shaped seal 148 which rests on a shoulder 150 of the flange 10. Also in this example, the coupling elements 32, 34 and also the sensor accommodation 121 are formed with projections 118 projecting towards the side walls 44, 46, which ensure a continuous transition to the respective adjacent side wall 44, 46. As mentioned above, these projections 118 are not required for larger nominal widths, as the coupling elements 32, 34 can then be inserted with their full surface into the transverse wall 42.

The sensor accommodation 121 and the system adapter are sealed with respect to the flange 10 by means of the circumferential sealing ring 38. Accordingly, four seals (two O-rings 110, the sealing ring 38 and the seal 148) are required for the solution according to FIG. 22.

The technical effort can be further reduced if—as shown in FIG. 23—the two coupling elements 32, 34 are inserted into a sensor plate 124 of the measuring housing 16, which is either formed on the system adapter 26 or attached to it. This means that the function of the sensor accommodation 121 explained in FIG. 22 is integrated in the measuring housing 16.

The sensor plate 124 has according to the drawing in FIG. 23d), accommodations 122a, 122b, in which the two coupling elements 32, 34 are inserted in a sealing manner. Sealing is achieved by means of the O-rings 110. The position of the coupling elements 32, 34 is then fixed by means of fixing elements 120, which hold the sensor system in the measuring housing 16.

In this example, at least a part of the sensor-side transverse wall 42 is formed by the sensor plate 124. For small nominal widths, the two projections 118 can again be formed on the coupling element 32, 34 and aligned to it on the sensor plate 124 (see FIGS. 23a), 23c)) so that a continuous transition to the adjacent side wall 44, 46 is ensured. The measuring housing 16 with the sensor plate 124 is then again sealed by means of the circumferential sealing ring 38 (FIG. 23c)) with respect to the housing 4. For this purpose, the sensor plate 124 is immersed in the recess 12 of the flange 10.

In the example shown in FIG. 21, only three seals (two O-rings 110 and the sealing ring 38) are required.

Due to the comparatively large recess 12, the reflector 52 of this example can also be inserted through the recess 12 into the pocket 78 of the pipe section 8, whereby the reflector 52 is also inserted flush and aligned into the transverse wall 40 below.

In the examples described above, a single sensor 28, 30 is arranged in each coupling element 32, 34. FIG. 24 shows an example in which two sensors 28a, 28b; 30a, 30b are arranged in each of the two coupling elements 32, 34. These sensors 28, 30 are connected to coupling wedges 48, 50 of the respective coupling element 32, 34. The fixing in the measuring housing 16 is again achieved by means of fastening means, for example screws and/or fixing elements 120. As explained above, also more than two sensors 28, 30 can each be integrated into one coupling element. In the drawing according to FIG. 24, one of the two protrusions 118a can be seen, which enter flush into the side walls 44, 46. In the drawing according to FIG. 24, also a circumferential ring groove 126 for the accommodation of an O-ring 110 is visible.

Such a double sensor has the advantage that two parallel signal paths can be formed, as shown in FIG. 25 for example. At the top, an example of a flow meter 1 with a comparatively small nominal diameter of DN50 is shown. The indicated measuring channel has, for example, an upper transverse wall 42 in which the two double sensors, i.e. the two coupling elements 32, 34 with the respective sensors 28a, 28b and 30a, 30b, are inserted flush. The coupling elements 32, 34 run with their coupling surfaces 116 flush to the transverse walls 42, whereby due to the small nominal width in the transition area to the side walls 44, 46, the coupling elements 32, 34 are each designed with the mentioned protrusions 118a, 118b, which run flush into the side walls 44, 46.

As explained at the beginning, such a double sensor is preferably used for lower nominal widths with a coupling element 32, 34 common to both sensors 28, 30. For larger nominal widths, two parallel single sensors are preferably used instead of a double sensor, so that four single sensors are held at the measurement attachment/measuring insert instead of two double sensors.

With such double sensors or single sensors arranged in pairs, the measurement takes place along two parallel signal paths 128a, 128b, which run for small nominal widths (see FIG. 25a)) at a comparatively smaller distance than for large nominal widths (see FIG. 25b)). With such large nominal widths, the sensor-side transverse wall 42 is so wide that this width is larger than the diameter of the coupling elements 32, 34, so that it is possible to dispense with the formation of the protrusions 118 and thus the coupling surface 116 is flat or is formed according to the slight curvature of the transverse surface 42.

FIG. 26 shows a design variation in which, in addition to the two sensors 28, 30 with the associated coupling elements 32, 34, a further sensor is provided, for example a pressure sensor 130. The example shown in FIG. 26 has the basic structure of the example according to FIG. 23, in which the two sensors are integrated into the measuring housing. The two coupling elements 32, 34 according to FIG. 26d) are inserted into the accommodations 122a, 122b of the sensor plate 124 on the measuring insert side. The pressure sensor 130 is located in the area between the two accommodations 122a, 122b or respectively the coupling elements 32, 34 inserted therein. Contact is established via contacts 132, which project through the sensor plate 124 and the system adapter 26 into the space surrounded by the control housing frame 58 and are contacted there with the electronic module 60 (see FIGS. 26b) and 26d)).

The drawing according to FIG. 26c) clearly shows the flush embedding of the coupling elements 32, 34 into the measuring channel 14. On the left side, the two protrusions 118 are visible, which enter flush into the side walls 44, 46.

In the example described above, the pressure sensor 130 is thus integrated into the control housing. FIG. 27 shows an example in which a pressure sensor module 134 is attached to the side of the pipe section 8, i.e. approximately in the middle of the side walls. Signal transmission and power supply are then carried out via a flexible line (power/signal transmission chain) 136, which is connected to the electronic module 60 or the battery pack 86 of the measuring housing 16. This connection of line 136 can be made in approximately the same way as it is provided for the communication modules (see FIG. 17b)).

FIG. 28 shows a variation of the double sensors according to FIG. 24. The basic structure corresponds to that of FIG. 24, so that explanations in this regard are unnecessary. In addition to the two double sensors, in the example according to FIG. 28, temperature sensors 138 are accommodated in the respective coupling elements 32, 34, by means of which the temperature of the sensors 28, 30 and/or of the coupling elements 32, 34 can be detected and corresponding signal corrections can be made in the event of a change in temperature. These temperature sensors 138 can, for example, be inserted into suitable recesses/pockets in the area of the coupling wedge of the 48.

FIG. 29 illustrates again the possibilities for the formation of a reference path.

Figure 29A:
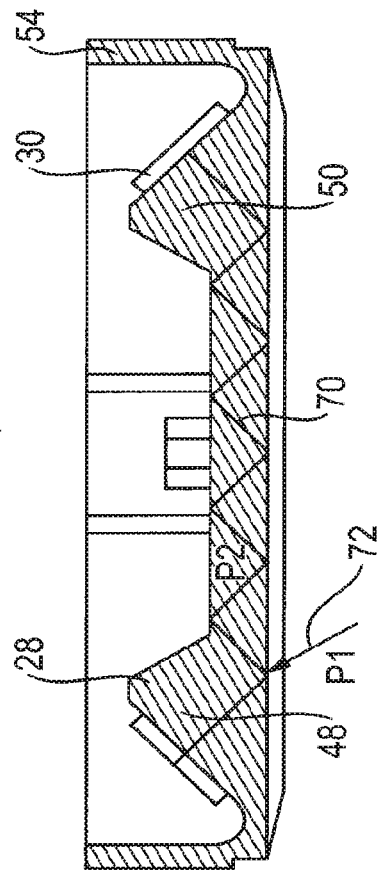

FIG. 29a) shows the already described reference path 70 (P2) in measuring bar 54, which extends from one sensor 28 in a zigzag pattern to the other sensor 30. The actual signal path 72 (P1) exits the measuring bar 54 after a comparatively short distance, whereby this occurs via the coupling surface 116 which is flush with the measuring channel 14.

Figure 29B:
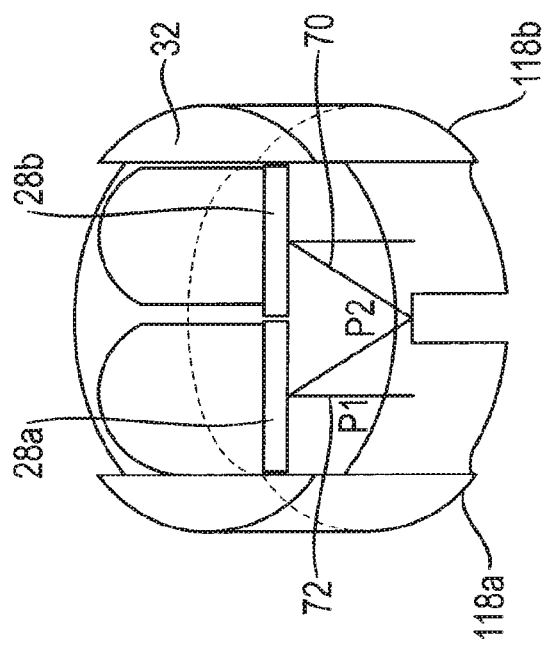

FIG. 29b) shows a possibility to form such a reference path P2 also in a coupling element 32. In this case, for example, a mirror 140 is arranged in the coupling element 32 in parallel to the sensor 28, which is supported by the coupling wedge 48. The measuring signal is then reflected via this mirror 140 and redirected back to the sensor 28, which then receives the transmitted signal again and thus makes a correction possible. The measuring beam P1 enters the measuring channel in a manner known per se via the coupling surface 116.

Figure 29C:
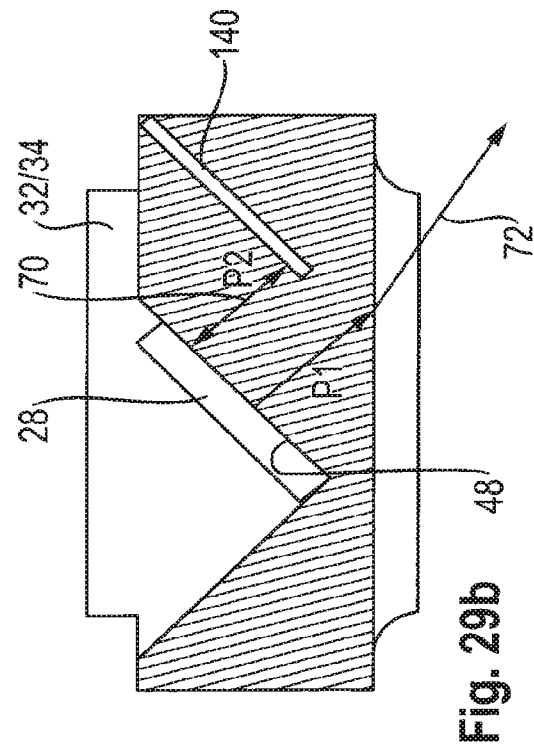
Figure 29D:
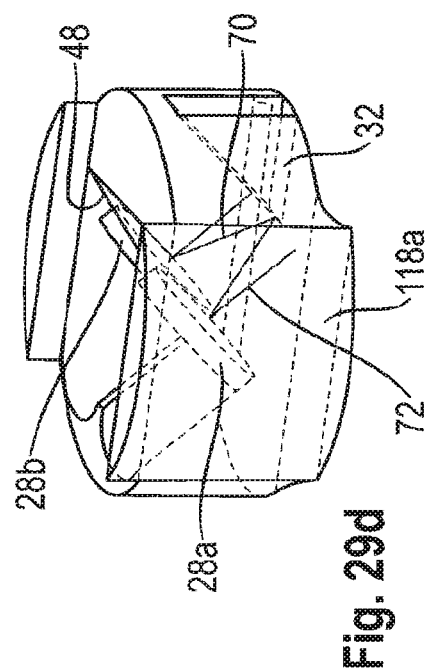

In a double sensor according to FIG. 29c), the coupling element 32 is designed in such a way that, for example, part of the signals transmitted by the sensor 28a are reflected in the coupling element 32 and deflected to the sensor 28b arranged in parallel, so that this sensor 28b receives the signal of the sensor 28a—a reference path P2 is again formed, which extends between the two sensors 28a, 28b. The majority of the signals are coupled into the measuring channel or the fluid flowing through it via the coupling element 32 and the coupling surface 116 in a manner known per se. The drawing according to FIG. 29 again indicates the protrusions 118a, 118b which are advantageous for a small nominal width.

In the examples described above, the oval cross-section of the measuring channel 14 with its high axis is either arranged in the vertical direction (i.e. in the direction of gravity) or obliquely to it. In principle, this "high axis" can also be arranged horizontally, i.e. transversely to the vertical direction.

FIG. 30 shows a flow meter 1 with a double sensor, as explained in FIGS. 24, 25, 28 and 29c).

As shown in FIG. 30a), housing 4 is in principle designed like in the examples described above. Accordingly, the housing has a flange 10 formed on the pipe section 8, on which the two recesses 12a, 12b for the coupling elements 32, 34 (see FIG. 30b)) are formed. In contrast to the examples described above, the end sections forming the coupling elements 32, 34 or respectively their coupling surface 116 and projecting into the recesses 12a, 12b are formed approximately rectangular with rounded "corner areas". Accordingly, the recesses 12a, 12b are also rectangular with rounded transitions between the shorter and the longer peripheral edges. As the drawing in FIG. 30a) further shows, each recess 12a, 12b has a shoulder 142 on which the respective O-ring 110 of the sensor 28, 30 rests in a sealing manner when mounted. In the example shown, the two sensors 28, 30, designed as double sensors, are inserted into the system adapter 26. This system adapter 26, for example, is pot-shaped (see FIG. 32) with corresponding accommodations 144 for the sensors 28, 30. After inserting these sensors 28, 30 into the accommodation 144 of the system adapter 26, the interior can be filled with a casting compound so that the sensors 28, 30 are reliably accommodated in a sealing manner. The system adapter 26 then carries the control housing frame 58 in the above-described manner, which accommodates the electronic module 60 and the like that is not shown.

In the example shown in FIG. 30, a system adapter 26 is thus assigned to both sensors 28, 30. In principle, it is also possible to accommodate both sensors 28, 30 in one system adapter each. The system adapter 26 is also called sensor plate. Such a solution with double sensors is—as mentioned at the beginning—especially used for flow meters 1 with a small nominal width.

For larger nominal widths, a solution as shown in FIG. 31 is preferred. In such an execution according to FIG. 31b), instead of the two double sensors, four single sensors 28a, 28b, 30a, 30b each with a coupling element 32a, 32b, 34a, 34b are used, to which four recesses 12a, 12b, 12c, 12d are accordingly assigned in the flange 10 of the housing 4. The basic structure of this solution with four single sensors corresponds to that of the example according to FIG. 30. However, the individual sensors 28a, 28b, 30a, 30b are not rectangular in shape but oval, i.e. with rounded vertex edges and somewhat longer longitudinal edges, which together form an approximately oval coupling surface 116. Accordingly, recesses 12a, 12b, 12c, 12d are also oval-shaped. The O-rings 110 also lie on shoulders 142 of the respective recesses 12a, 12b, 12c, 12d in this example. Corresponding shoulders for the seals are in principle realized with all examples described above.

For sealing between the flange 10 and the system adapter, a sealing ring 38 is again provided which is not shown.

As in the examples described above, the single and double sensors shown are each inserted in coupling elements 32, 34, whereby the respective piezoceramics each rest on a coupling wedge 50 of the coupling element 30, 32. Since these elements are already described in detail above, reference is made to this explanation to avoid repetitions in this regard.

As explained above, for the larger nominal widths, the distance between the adjacent single sensors 28a, 28b or 30a, 30b—as shown in FIG. 25b) can be larger than for the example according to FIG. 30, so that the signal paths run at a larger parallel distance. In the example shown, all four sensors 28a, 28b, 30a, 30b are again accommodated in a common system adapter 26 and preferably fixed in position by means of a casting compound 146.

In FIG. 32, the two concepts are arranged side by side in a longitudinal section. FIG. 32a) shows the longitudinal section of the example according to FIG. 30. In this drawing the two coupling elements 32, 34 can be seen, on whose wedge surfaces 48, 50, two sensors 28 or respectively 30 (only respectively one visible in FIG. 32a)) are arranged.

These are each inserted into recesses 12a, 12b and sealed there by means of the O-rings 110. The coupling surfaces 116 run flush to the peripheral wall (transverse wall 42 and adjacent areas of the side walls 44, 46) of the measuring channel 14, which in this example is formed by the pipe section 8. Part of the flange 10 thus forms the transverse wall 42. The opposite transverse wall 40 of this example is formed with the pocket 78 open towards the outside, into which the reflector 52 is pressed.

In this drawing the casting compound 146 can be seen with which the two coupling elements 32, 34 with the sensors 28, 30 are fixed in position in the pot-shaped system adapter 26.

FIG. 32b) shows a corresponding section of the flow meter according to FIG. 31. According to the relevant explanations, the two coupling elements 32, 34 of this example executed with single sensors are considerably more compact than in the example according to FIG. 32a. Each of the coupling elements 32 is sealed in the respective recess 12a, 12b, 12c, 12d by means of an O-ring 110. All coupling surfaces are flush with the transverse wall 42.

In the drawing according to FIG. 32b), the reflector 52 was not shown for the sake of simplicity. In principle, however, it is located at the same position as the aforementioned reflector 52. This is indicated by a dotted line.

In principle, the technical effort in terms of devices and assembly is greater for the example according to FIG. 32b) than for the example described above, since, for example, four recesses 12a, 12b, 12c, 12d and four single sensors 28a, 28b, 30a, 30b/coupling elements 32a, 32b, 34a, 34b and corresponding O-rings 110 have to be provided, whereas for the example according to FIG. 31a) only two of these respective components are present.

In the examples described in FIGS. 30, 31, 32, the transverse wall 42 is formed by part of the flange 10. However, as explained above, instead of the individual recesses 12a, 12b, 12c, 12d, a comparatively large recess 12 can also be provided, into which a system adapter 26 or a sensor plate is then immersed, in which the coupling elements 32, 34 are then arranged flush, so that the system adapter forms a part of the measuring channel and the transverse wall 42 of the oval profile. Such an example is explained, for example, in FIG. 22 above. In this variation, the system adapter 26 has a sensor accommodation 121 (sensor plate 124) in which the sensors 28, 30 are inserted.

In a preferred solution, the system adapter 26 itself is designed as a sensor accommodation, whereby in contrast to the examples according to FIGS. 30, 31, 32, the coupling elements 32, 34 are inserted flush into the system adapter or the sensor accommodation 121/sensor plate 124 (these are then practically integrated into the system adapter 26).

The Applicant reserves the right to base independent claims on each of these concepts (arrangement of the sensors/coupling elements in the pipe section or flush in a sensor accommodation/a sensor plate or flush in the system adapter).

In the examples according to FIGS. 21, 22, 23, too, the single sensors or respectively their coupling elements 32, 24 can be fixed in position with the respective system adapter 26 or respectively the sensor plate 124/the sensor accommodation 121 by means of the casting compound 146.

Disclosed is a flow meter with at least two measuring sensors, preferably ultrasonic sensors, spaced apart from each other, wherein the coupling of the measuring signals into and out of a fluid is performed via a coupling element According to the disclosure, the measuring channel is formed with an approximately oval or trapezoid cross-section.

LIST OF REFERENCE SIGNS 1 flow meter
2 measuring insert/measurement attachment
4 housing
5 mounting flange
6 mounting flange
8 pipe section
10 flange
12 recess
14 measuring channel
16 measuring housing
20 interior
22 lead-in body
24 lead-out body
26 system adapter
28 sensor
30 sensor
32 coupling element
34 coupling element
36 housing bottom
38 seal ring
40 transverse wall
42 transverse wall
44 side wall
46 side wall
48 coupling wedge
50 coupling wedge
52 reflector
54 measuring bar
56 accommodation
57 console
58 control housing frame
60 electronic module
62 connector
64 printed circuit board
66 seal
68 casting compound
70 reference path
72 signal path
74 digital display
76 communication module
78 pocket
80 projection
82 housing cover
84 pane
86 battery pack
88 battery supply opening
90 holder
92 lid
94 shell
96 shell
98 battery block
100 contacts
102 cover
104 sealing cap
106 accommodation chamber
108 ring flange
110 O-ring
112 adhesive, grease, gel
114 electrode
116 coupling surface
118 projection 120 fixing element
121 sensor accommodation
122 accommodation
124 sensor plate
126 ring groove
128 signal path
130 pressure sensor
132 contact
134 pressure sensor module
136 flexible line
138 temperature sensor
140 mirror
142 shoulder
144 accommodation
146 casting compound
148 seal
150 shoulder for seal

The invention claimed is:

1. A flow meter having a measuring channel configured to be attached to a pipe, through which measuring channel a fluid flows and on which measuring channel a measuring unit is held, the measuring unit including at least two sensors, the at least two sensors spaced apart from each other and immersed in at least one recess of the measuring channel, wherein a coupling of measuring signals into or out of the fluid is performed via a measuring bar or via a respective coupling element which accommodates at least one of the at least two sensors, wherein the measuring channel has a cross-section which has approximately in an emitter/receiver direction of the at least two sensors a larger clear width than transverse to it, and further wherein the measuring channel has approximately an oval shape or is tapered in a trapezoidal form in a region opposite the at least two sensors, wherein side walls extending in a direction of a high axis are curved out and form the oval shape with transverse walls which are approximately flat or slightly curved out and extend approximately in the direction of a transverse axis, wherein in one of the transverse walls remote from the at least two sensors a reflector is arranged which is inserted flush in a pocket of the transverse wall.

2. The flow meter according to claim 1, wherein the measuring bar or the coupling elements are inserted flush into one of the transverse walls.

3. The flow meter according to claim 2, wherein a ratio of a width of the measuring channel at a vertex of curvatures to a width of the transverse walls is greater than 1.2, and wherein a ratio of a height extension of the side walls to the width of the transverse walls is greater than 1.5.

4. The flow meter according to claim 2, wherein each coupling element extends as far as into the side walls.

5. The flow meter according claim 1, wherein the measuring bar or the coupling elements are attached to a measuring housing which accommodates control electronics, further sensors, a battery pack, communication modules and/or a power supply.

6. The flow meter according to patent claim 5, wherein the coupling elements or the measuring bar are directly attached in the measuring housing or attached to the measuring housing by a sensor accommodation or a system adapter.

7. The flow meter according to claim 5, wherein the measuring channel has a flange which encompasses the recess and to which a system adapter which indirectly or directly carries the at least two sensors or a sensor accommodation of the measuring housing is fastened, such that coupling surfaces of the coupling elements extend flush with a peripheral wall of the measuring channel.

8. The flow meter according to claim 1, wherein at least one of the coupling elements or the measuring bar has a coupling wedge which is inclined with respect to a measuring channel axis and on which at least one sensor of the at least two sensors rests.

9. The flow meter according to claim 1, wherein at least one of the coupling elements is sealed in the measuring channel by means of a seal.

10. The flow meter according to claim 1, wherein the measuring channel is at least in sections inserted into a pipe section or a pipe section itself forms the measuring channel.

11. The flow meter according to claim 10 having a housing comprising two mounting flanges between which the pipe section and/or the measuring channel extends, wherein the cross-section in an inlet area or respectively outlet area of the mounting flanges is larger than in the measuring channel.

12. The flow meter according to claim 1, wherein at least one of the coupling elements is made of PEEK, PSU or PEI or another suitable plastic material.

13. Flow meter according to claim 1, wherein in at least one coupling element at least two sensors are accommodated.

14. The flow meter according to claim 1, wherein within at least one coupling element or the measuring bar a reference path is formed.

15. The flow meter according to claim 1, wherein in at least one of the coupling elements or in the measuring bar or at a measuring housing, a temperature sensor or a pressure sensor or another sensor is accommodated.

16. The flow meter according to claim 1, wherein the at least two sensors are ultrasonic sensors.

* * * * *